(12) United States Patent
Uchida et al.

(10) Patent No.: US 10,451,778 B2
(45) Date of Patent: Oct. 22, 2019

(54) DIFFUSER PLATE AND METHOD FOR PRODUCING DIFFUSER PLATE

(71) Applicant: KURARAY CO., LTD., Kurashiki-shi (JP)

(72) Inventors: Atsushi Uchida, Kamisu (JP); Masashi Hirai, Kamisu (JP); Masaru Karai, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/515,164

(22) PCT Filed: Sep. 29, 2015

(86) PCT No.: PCT/JP2015/004927
§ 371 (c)(1),
(2) Date: Mar. 29, 2017

(87) PCT Pub. No.: WO2016/051766
PCT Pub. Date: Apr. 7, 2016

(65) Prior Publication Data
US 2017/0235028 A1 Aug. 17, 2017

(30) Foreign Application Priority Data
Sep. 30, 2014 (JP) ................. 2014-201607

(51) Int. Cl.
*G02B 5/02* (2006.01)
*G02B 3/00* (2006.01)
(Continued)

(52) U.S. Cl.
CPC ............ *G02B 5/0221* (2013.01); *G02B 3/00* (2013.01); *G02B 3/0031* (2013.01);
(Continued)

(58) Field of Classification Search
CPC .... G02B 27/48; G02B 3/0043; G02B 5/0221; G02B 5/0278; G02B 5/0284; G02B 27/0012
See application file for complete search history.

(56) References Cited

U.S. PATENT DOCUMENTS 7,839,573 B2    11/2010  Wippermann et al.
2002/0034014 A1  3/2002  Gretton et al.
(Continued)

FOREIGN PATENT DOCUMENTS

CN    1386203 A      12/2002
JP    2004-505306 A   2/2004
(Continued)

OTHER PUBLICATIONS

Hakan Urey, et al., "Microlens-array-based exit-pupil expander for full-color displays," Applied Optics, vol. 44, No. 23, Aug. 10, 2005, pp. 4930-4936.
(Continued)

*Primary Examiner* — Darryl J Collins
*Assistant Examiner* — Journey F Sumlar
(74) *Attorney, Agent, or Firm* — Oblon, McClelland, Maier & Neustadt, L.L.P.

(57) ABSTRACT

The present invention provides a diffuser plate and a method for producing a diffuser plate that can improve variations in luminance of transmitted light or reflected light in a simple structure and that enable easy design and production. The diffuser plate according to the present invention is a diffuser plate where a plurality of microlenses are placed on a principal surface, wherein a phase difference generation part is inserted between the plurality of microlenses and the principal surface, the plurality of microlenses have two or more types of lens shapes, and the number of microlenses having the two or more types of lens shapes is determined
(Continued)

so that a quantity ratio of the two or more types of lens shapes is a specific value, each of the lens shape types is selected corresponding to each of coordinates on the principal surface in which centers of undersurfaces of the plurality of microlenses are placed, and an angle range in which the diffuse light intensity is substantially uniform is in a range of +10% to −10% of a desired angle range.

8 Claims, 24 Drawing Sheets

(51) Int. Cl.
    *G02B 5/30*         (2006.01)
    *G02B 27/48*      (2006.01)

(52) U.S. Cl.
    CPC ............. *G02B 3/0043* (2013.01); *G02B 5/02* (2013.01); *G02B 5/0268* (2013.01); *G02B 5/0294* (2013.01); *G02B 5/3083* (2013.01); *G02B 27/48* (2013.01)

(56) References Cited

U.S. PATENT DOCUMENTS

| | | |
|---|---|---|
| 2002/0034710 A1 | 3/2002 | Morris et al. |
| 2006/0256442 A1 | 11/2006 | Hasei |
| 2007/0103747 A1 | 5/2007 | Powell et al. |
| 2007/0229804 A1* | 10/2007 | Inoue .................. G02B 5/0242 356/213 |

FOREIGN PATENT DOCUMENTS

| | | |
|---|---|---|
| JP | 2007-523369 A | 8/2007 |
| JP | 2010-145745 A | 7/2010 |
| JP | 2012-226300 A | 11/2012 |
| WO | WO 2014/122912 A1 | 8/2014 |

OTHER PUBLICATIONS

International Search Report dated Dec. 8, 2015 in PCT/JP2015/004927 filed Sep. 29, 2015.
Combined Office Action and Search Report dated Jul. 23, 2018 in Chinese Patent Application No. 201580053183.6. (with English translation), 11 pages.
Extended European Search Report dated May 4, 2018 in European Patent Application No. 15846865.2, 10 pages.

* cited by examiner

DIFFUSER PLATE AND METHOD FOR PRODUCING DIFFUSER PLATE

TECHNICAL FIELD

The present invention relates to a diffuser plate and a method for producing a diffuser plate.

BACKGROUND ART

A diffuser plate using a microlens array is used as screens such as a head-up display and a laser projector. Using a microlens array is advantageous in that it is possible to suppress speckle noise of laser light compared with using a diffuser plate such as a translucent plate or a frosted glass.

Patent Literature 1 discloses an image forming device including a diffuser plate using a laser projector that has laser light as a light source and projects a video which is an array of a plurality of pixels and a microlens array in which a plurality of microlenses are placed in an array. Using a microlens array makes it possible to appropriately diffuse incident light and flexibly design a necessary angle of diffusion.

Patent Literatures 2 and 3 and Non Patent Literature 1 disclose a screen using two microlens arrays. In the case of using a single microlens array, variations in luminance and color are likely to occur. Patent Literatures 2 and 3 and Non Patent Literature 1 describe that, with use of two microlens arrays, it is possible to suppress the occurrence of variations in luminance.

Patent Literature 4 discloses a method for improving variations in luminance and color that occur due to diffraction spots caused by the periodicity of a microstructure by placing a piston form (raised part) having a vertical side surface on a microlens and by randomly distributing at least one of parameters that define the shape or position of a microstructure according to a predetermined probability density function.

Patent Literature 4 describes an optical design method that (a) defines the shape of a microstructure such as a microlens formed on a substrate surface, (b) specifies the placement of a selected microstructure, (c) calculates the distribution of diffuse light intensity, and (d) repeats the process of (a) to (c) until a desired distribution of diffuse light intensity is obtained. Further, Patent Literature 4 discloses a method for improving variations in luminance due to diffraction spots caused by the periodicity of a microstructure by randomly distributing at least one of parameters that define the shape or position of a microstructure according to a predetermined probability density function.

Patent Literature 5 discloses a device where emitted light is uniformized by arranging various types of chirped microlenses in which at least some lens shape shapes are not identical and the numerical aperture is the same randomly or sequentially on a reference plane in order of lens size.

CITATION LIST

Patent Literature

PTL1: Japanese Unexamined Patent Application Publication No. 2010-145745
PTL2: Japanese Unexamined Patent Application Publication No. 2012-226300
PTL3: Japanese Unexamined Patent Application Publication (Translation of PCT Application) No. 2007-523369
PTL4: Japanese Unexamined Patent Application Publication (Translation of PCT Application) No. 2004-505306
PTL5: United States Patent Publication No. 07839573

Non Patent Literature

NPL1: H. Urey and K. D. Powell, "Microlens-array-based exit-pupil expander for full-color displays", APPLIED OPTICS Vol. 44, No. 23, p. 4930-4936

SUMMARY OF INVENTION

Technical Problem

The design methods disclosed in Patent Literatures 4 and 5 require repetitive calculations, and it is necessary to perform calculations many times until a calculation result becomes a desired result, which raises a problem of heavy workload. Further, there is an error between the designed microlens shape and the microlens shape of a produced diffuser plate, and it is not possible to fully obtain the desired optical properties. Particularly, when forming a microlens shape by photolithography using laser beams, if the pitch of a designed microlens is narrow, the effect of a laser beam diameter becomes relatively greater, and the error is likely to increase. Therefore, the workload for producing a diffuser plate in a shape close to the designed shape is heavy. Further, if a random distribution is added to a plurality of parameters such as the curvature and position of a plurality of microlenses, speckle is likely to occur when the diffuser plate is used as a screen, which raises a problem of degradation in image quality.

Further, Patent Literature 5 arranges a plurality of types of microlenses that are not in the same shape randomly or in order of microlens size. In the diffuser plate where microlenses of which shape, such as pitch and lens height, is largely different are placed, it is difficult to produce the shape of a connection between microlenses accurately in accordance with design values.

The present invention has been accomplished to solve the above problems and an object of the present invention is thus to provide a diffuser plate and a method for producing a diffuser plate in a simple structure that can improve variations in luminance of transmitted light or reflected light and that enable easy design and production.

Solution to Problem

A diffuser plate according to the present invention is a diffuser plate where a plurality of microlenses are placed on a principal surface, wherein a phase difference generation part is inserted between the plurality of microlenses and the principal surface, the plurality of microlenses have two or more types of lens shapes, and the number of microlenses having the two or more types of lens shapes is determined so that a quantity ratio of the two or more types of lens shapes is a specific value, each of the lens shape types is selected corresponding to each of coordinates on the principal surface in which centers of undersurfaces of the plurality of microlenses are placed, when an arithmetic average of diffuse light intensity in a desired angle range in the diffuser plate is 1, a standard deviation of relative intensity of diffuse light intensity in the desired angle range is equal to or less than $9.00 \times 10^{-2}$, and an angle range in which the diffuse light intensity is substantially uniform is in a range of +10% to −10% of the desired angle range, where the angle range in which the diffuse light intensity is substantially uniform is a difference between a diffusion angle at which an absolute value reaches its maximum on a positive side and a diffusion angle at which an absolute value reaches its maximum on a negative side, out of diffusion angles with a relative intensity of 90% with respect to an arithmetic average of diffuse light intensity in the desired angle range, when a direction along a light incidence direction is at a diffusion angle of 0°, one direction in an angle distribution measurement direction is positive and an opposite direction is negative in an angle distribution of diffuse light intensity in one direction of the diffuser plate.

In the preset invention, it is preferred that a maximum value of a phase difference caused by the phase difference generation part is larger than 0.2 times a wavelength of light to be used.

In the preset invention, it is preferred that the desired angle range AngA is 0°≤AngA≤40°.

In the preset invention, it is preferred that a height of the phase difference generation part from the principal surface varies in accordance with an algebraic function, an elementary function or a composite function of them where coordinates in which the plurality of microlenses are placed are independent variables.

In the preset invention, it is preferred that a height of the phase difference generation part from the principal surface is set randomly.

In the preset invention, it is preferred that a type of the microlens is selected in accordance with an algebraic function, an elementary function or a composite function of them where coordinates in which the microlens is placed are independent variables.

In the preset invention, it is preferred that a type of the microlens is selected randomly for coordinates in which the microlens is placed.

A method for producing a diffuser plate according to the present invention is a method for producing a diffuser plate where a plurality of microlenses are placed on a principal surface, the method including a step of designing a plurality of types of microlens sets where the plurality of microlenses are placed on the principal surface, the plurality of microlenses having one type of lens shape with which an angle distribution of diffuse light intensity close to a desired angle range is obtained, and a phase difference generation part is inserted between the plurality of microlenses and the principal surface; a step of producing a plurality of types of sample molds having shapes respectively corresponding to the plurality of types of microlens sets; a step of transferring a shape of one type of microlens set to resin by using the sample mold, and thereby producing a plurality of types of sample diffuser plates each having one type of diffusion pattern of the microlens set; a step of evaluating optical properties of each of the plurality of types of sample diffuser plates; a step of designing a microlens array combining the plurality of types of microlens sets based on evaluation results of each of the plurality of types of sample diffuser plates; a step of producing a diffusion pattern mold having a shape corresponding to the microlens array; and a step of transferring the diffusion pattern to resin by using the diffusion pattern mold.

Advantageous Effects of Invention

According to the present invention, it is possible to provide a diffuser plate and a method for producing a diffuser plate in a simple structure that can improve variations in luminance of transmitted light or reflected light and that enable easy design and production.

DESCRIPTION OF EMBODIMENTS

Embodiments of the present invention are described hereinafter with reference to the drawings.

First Embodiment

Figure 1:
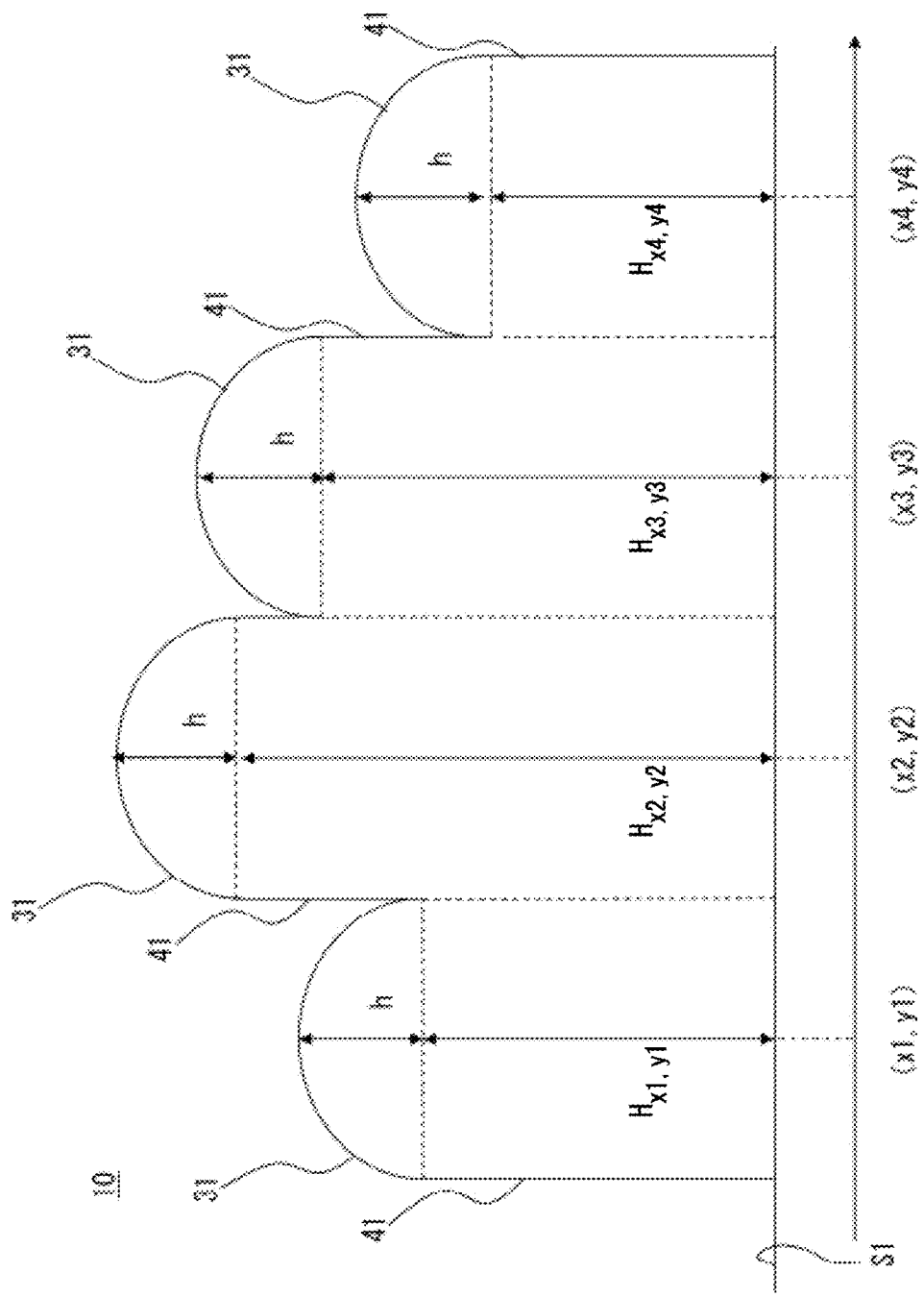
FIG. 1 is a view showing an example of the cross-sectional profile of a microlens set (convex lens) designed in a production process of a diffuser plate according to a first embodiment.

A diffuser plate 10 according to this embodiment is a diffuser plate in which a plurality of microlenses are placed on the principal surface. FIG. 1 is a cross-sectional view showing the state where a plurality of microlenses 31 are placed on a reference surface S1. In FIG. 1, the reference surface S1 is the principal surface of the diffuser plate 10.

In the diffuser plate 10 according to this embodiment, a raised part 41 (phase difference generation part) is inserted between the plurality of microlenses 31 and the reference surface S1 (principal surface) as shown in FIG. 1. By placing the raised part 41 with a different height for each of the plurality of microlenses 31, a phase difference for each microlens 31 is generated in light beams that pass through the plurality of microlenses 31. The maximum value of a phase difference that is generated by the raised part 41 is preferably larger than 0.2 times the wavelength of light to be used.

In FIG. 1, the microlenses 31 having the same lens shape are placed in an array. However, in the diffuser plate 10 according to this embodiment, the plurality of microlenses 31 have two or more types of lens shapes. Further, the number of microlenses 31 having each of the two or more types of lens shapes is determined so that the quantity ratio of the two or more types of lens shapes is a specific value. Each shape type is selected corresponding to each of the coordinates on the reference surface S1 in which the centers of the undersurfaces of the plurality of microlenses 31 are placed.

When the arithmetic average of the diffuse light intensity in a desired angle range in the diffuser plate 10 according to this embodiment is 1, the standard deviation of the relative intensity of the diffuse light intensity in the desired angle range needs to be equal to or less than $9.00 \times 10^{-2}$. Note that the desired angle range AngA is preferably $0° \leq AngA \leq 40°$.

In the diffuser plate 10 according to this embodiment, the angle range AngB in which the diffuse light intensity is substantially uniform is preferably in the range of +10% to −10% of a desired angle range. The angle range AngB in which the diffuse light intensity is substantially uniform is a difference between the diffusion angle at which the absolute value reaches its maximum on the positive side and the diffusion angle at which the absolute value reaches its maximum on the negative side, out of the diffusion angles with a relative intensity of 90% with respect to the arithmetic average of the diffuse light intensity in the desired angle range, when a direction along the light incidence direction is at a diffusion angle of 0°, one direction in the angle distribution measurement direction is positive and the opposite direction is negative in the distribution of diffuse light intensity in a certain one direction of the diffuser plate 10.

Figure 35:
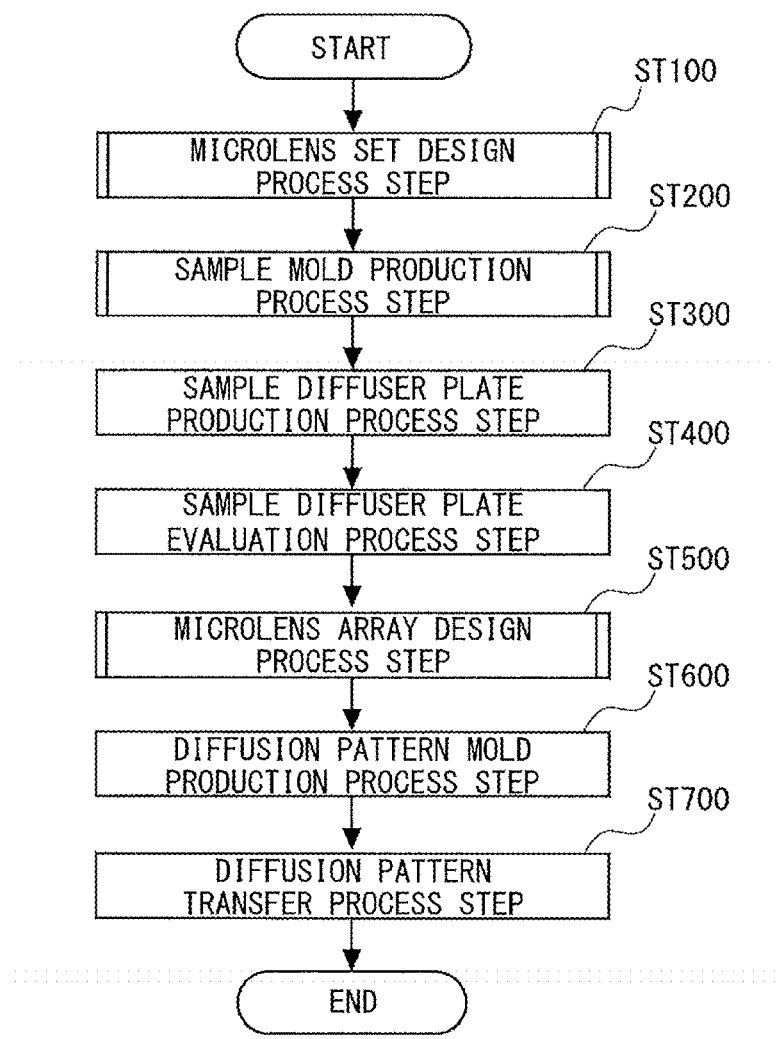
FIG. 35 is a flowchart showing a method for producing a diffuser plate according to the first embodiment.

A method for producing the diffuser plate 10 according to this embodiment is described hereinafter with reference to the flowchart of FIG. 35. As shown in FIG. 35, first, a plurality of types of microlens sets in which the plurality of microlenses 31 having one type of lens shape for obtaining the angle distribution of diffuse light intensity close to the desired angle range are placed on the principal surface, and the raised parts 41 are inserted between the plurality of microlenses 31 and the principal surface are designed (ST100). Next, a plurality of types of sample molds having the shapes respectively corresponding to the plurality of types of microlens sets are produced (ST200).

Then, the shape of one type of microlens set is transferred to resin by using each of the sample molds, and thereby a plurality of types of sample diffuser plates having the diffusion pattern of the microlens set are produced (ST300). The optical properties of each of the plurality of types of sample diffuser plates are evaluated after that (ST400). Then, a microlens array that combines a plurality of types of microlens sets is designed based on the evaluation results of each of the plurality of types of sample diffuser plates (ST500). Then, a diffusion pattern mold having the shape corresponding to the microlens array is produced (ST600). After that, the diffusion pattern is transferred to resin by using the diffusion pattern mold (ST700).

Process steps ST100 to ST700 are sequentially described hereinbelow.

(Design of Plurality of Types of Microlens Sets)

First, the process step of designing a plurality of types of microlens sets (ST100 can) is described.

Step ST100 can be performed by a worker with use of a computer. Specifically, a typical computer including CPU, ROM, RAM, input means (keyboard, mouse) and output means (monitor, printer, data output port) in which a lens design program on the basis of geometric optics is installed may be used.

The flow of the process step of designing a plurality of types of microlens sets is described with reference to FIG. 36. The first to be performed in the microlens set design process is to design the shape of the microlens 31 and prepare the lens data of the microlens 31 (ST110). In order to achieve that the diffuse light intensity is substantially uniform in a desired angle range, the design of the shape of the microlens 31 is significantly important. Another thing to be considered is to suppress the occurrence of variations in luminance due to diffraction and interference even when a large number of microlenses 31 are placed. If only one shape type of the microlens 31 is used, there is a possibility that variations in luminance due to diffraction and interference are likely to occur when a large number of one type of microlenses 31 are placed in an array. However, it takes lots of time and effort to perform design by simulation one by one to prepare a plurality of shapes of the microlenses 31.

In this embodiment, design by simulation is not performed, and a plurality of types of lens shapes of the microlenses 31 having the diffusion properties close to the desired angle distribution of diffuse light intensity are designed by optical design using geometric optics. As a matter of course, however, this does not exclude the option of performing design by simulation.

Figure 2:
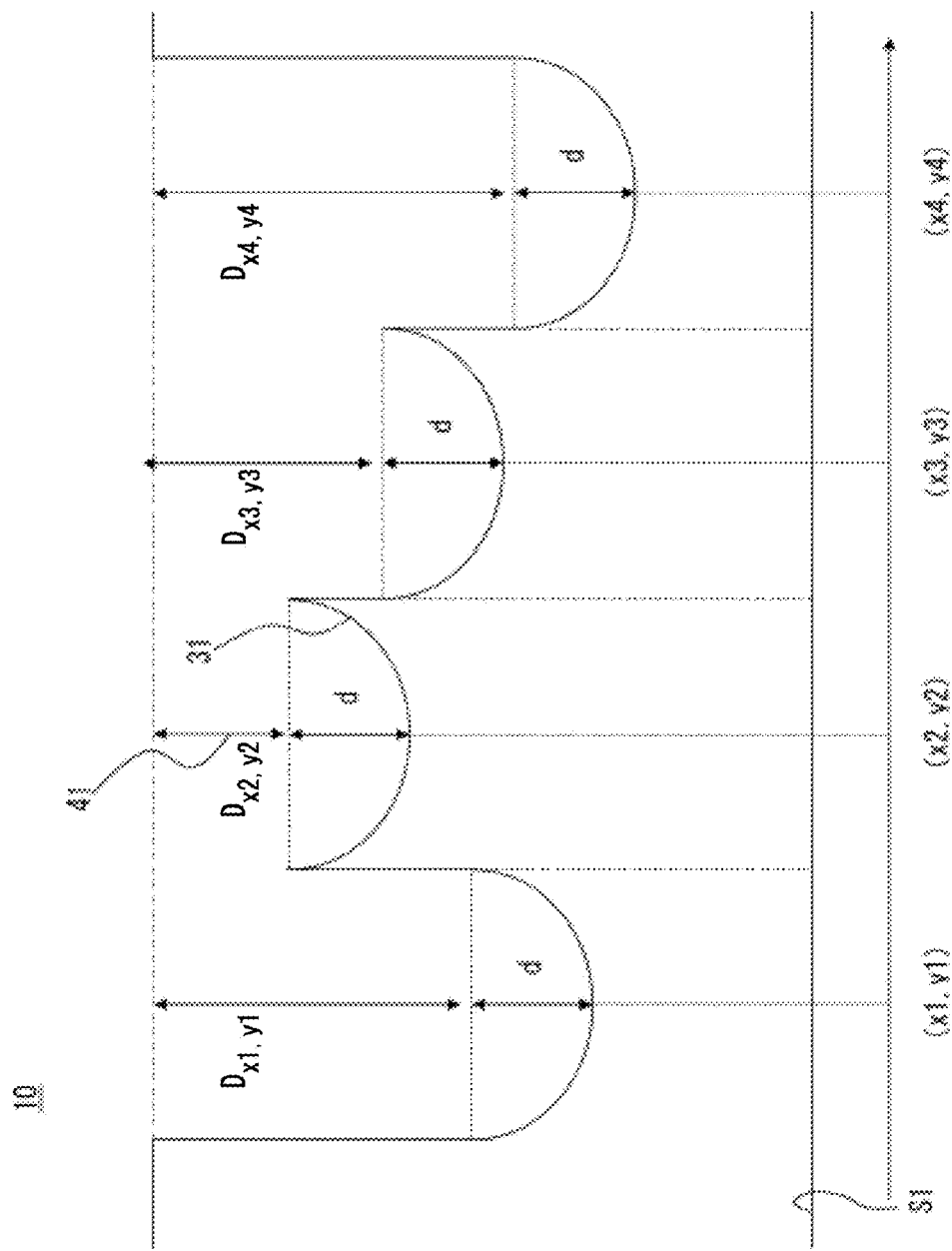
FIG. 2 is a view showing an example of the cross-sectional profile of a microlens set (concave lens) designed in a production process of the diffuser plate according to the first embodiment.

The microlenses 31 that constitute a microlens set may be any of convex lenses and concave lenses. FIG. 1 shows an example of the cross-sectional profile of the designed plurality of convex microlenses 31 and the raised parts 41. FIG. 2 shows an example of the cross-sectional profile of the designed plurality of concave microlenses 31 and the raised parts 41.

Although the height h or the depth d of the microlens 31 are not particularly limited, it is preferably 30 μm or less in order that the asperity on the surface of the diffuser plate 10 as the end product is less visible to human eyes. Further, the height h or the depth d of the microlens 31 is preferably 1 μm or more in consideration of the easiness of forming a three-dimensional shape in the production process.

The microlens 31 according to this embodiment may be any one of spherical, aspherical, cylindrical, toroidal and Fresnel lenses.

The shape of the undersurface of the microlens 31 is preferably a shape that is regularly repeatable, and for example, any one type may be selected from triangle, quadrangle, hexagon and other various polygons.

Figure 36:
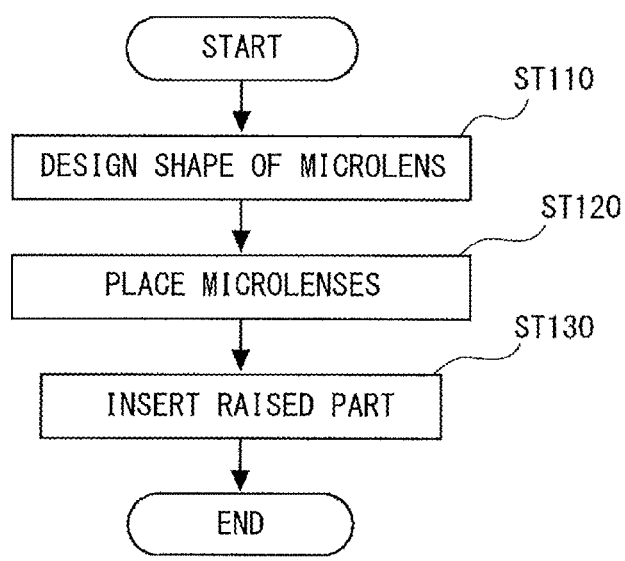
FIG. 36 is a flowchart showing a microlens set design method in the method for producing a diffuser plate according to the first embodiment.

As shown in FIG. 36, after Step ST110, the microlenses 31 designed in ST110 are placed on the reference surface S1 (ST120). Further, the raised part 41 (phase difference generation part) is inserted between each of the plurality of microlenses 31 and the reference surface S1 in order to add a phase difference to each of the microlenses 31 (ST130).

Merely placing the microlenses 31 in the same shape causes the occurrence of variations in luminance due to diffraction and interference arising from the periodicity of the microlens 31. Thus, in the microlens set according to this embodiment, the angle distribution of diffuse light intensity of transmitted light or reflected light from each microlens 31 is set to be identical, and the phase difference between the microlenses 31 which is different from one another is distributed within a set range. The phase difference of the microlenses 31 is represented by normalizing a difference in the optical path length of light transmitted or reflected by the microlens 31 by wavelength.

Although various elements, such as the height, curvature, pitch, placement and refractive index of the whole microlens 31, can be selected for varying the phase difference, the raised part 41 is inserted between each of the plurality of microlenses 31 and the reference surface S1 in order to add a phase difference to each microlens 31 in the microlens set according to this embodiment. The microlens set is characterized in that the height of the raised part 41 is varied, and the curvature of each microlens 31 is the same. Consequently, the optical design results of one microlens 31 can be reflected in the optical properties of the whole microlens set, and it is thereby possible to simplify the design process.

The microlenses 31 that constitute the microlens set in Step ST100 are the same in the basic elements related to the lens shape, such as the lens height h or depth d excluding the raised part 41, the lens pitch, the lens curvature radius, the lens undersurface shape and the lens numerical aperture, for example, and also the same in the angle distribution of diffuse light intensity. Hereinafter, the microlenses 31 that satisfy those requirements are referred to as single-type microlenses 31.

Figure 3:
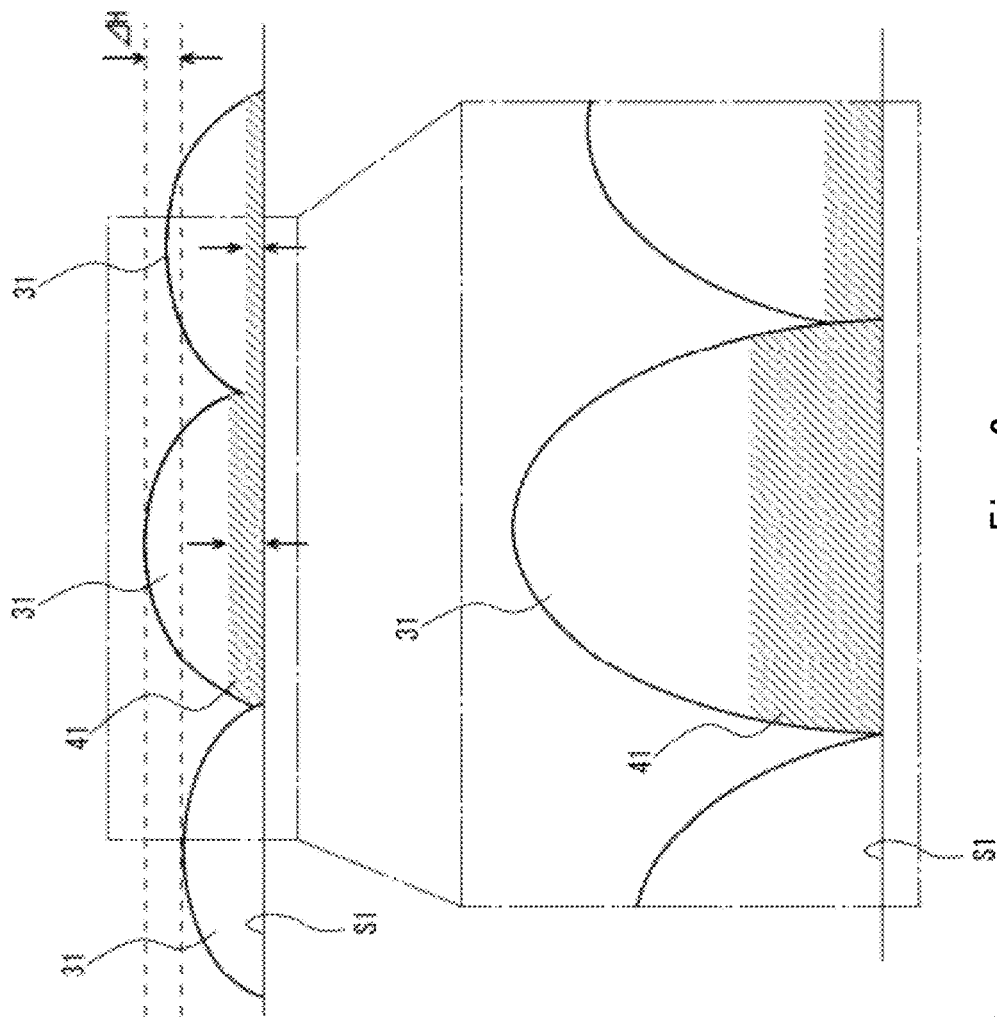
FIG. 3 is a view showing an example of the cross-sectional profile of a microlens set according to the present invention.

In Step ST110, the single-type microlenses 31 are placed in a regular repetitive manner on the reference surface S1. As shown in FIG. 3, in order to vary the phase of each of the microlenses 31, the raised part 41 is placed below the undersurface of each microlens 31. The reference surface S1 in this specification is preferably parallel to a plane of incidence. Further, the reference surface S1 in the design stage can be regarded as the principal surface of the diffuser plate 10.

In the case of a transmissive diffuser plate in which the microlenses 31 are convex lenses, a difference $\Delta H[\mu m]$ between the maximum height and the minimum height of the convex part of the microlens 31 from the reference surface S1 is controlled to satisfy the relationship represented by the following expression (1):

$$0.2 \leq 1000 \times \Delta H \times (n-1)/\lambda \tag{1}$$

where n is the refractive index of the microlens 31 and $\lambda$ is the wavelength of light [nm].

In order to achieve the improvement of variations in luminance, the maximum value of the phase difference of the plurality of microlenses 31 is preferably set to 0.2 or more. Further, from the viewpoint of reducing the interference by a phase difference, the average of phase differences is preferably set to approximately 0.5. In the case where a light source has a plurality of wavelengths, a phase difference can be calculated for the longest wavelength among the wavelengths used.

In the case of a transmissive diffuser plate in which the microlenses 31 are concave lenses, a difference ΔD[μm] between the maximum depth and the minimum depth of the concave part of the microlens 31 from the reference surface S1 is controlled to satisfy the relationship represented by the following expression (2):

$$0.2 \le 1000 \times \Delta D \times (n-1)/\lambda \quad (2)$$

where n is the refractive index of the microlens 31 and λ is the wavelength of light [nm].

On the other hand, in the case of a reflective diffuser plate 10 in which the microlenses 31 are convex lenses, a difference ΔH[μm] between the maximum height and the minimum height of the convex part of the microlens 31 from the reference surface S1 is controlled to satisfy the relationship represented by the following expression (3):

$$0.1 \le \Delta H \times 1000/\lambda \quad (3)$$

where λ is the wavelength of light [nm].

In order to achieve the improvement of variations in luminance, a phase difference is preferably set to 0.2 or more, and the average of phase differences is preferably set to approximately 0.5, just like the case of a transmissive type.

In the case of a reflective diffuser plate 10 in which the microlenses 31 are concave lenses, a difference ΔD[μm] between the maximum depth and the minimum depth of the concave part of the microlens 31 from the reference surface S1 is controlled to satisfy the relationship represented by the following expression (4):

$$0.1 \le \Delta D \times 1000/\lambda \quad (4)$$

where λ is the wavelength of light [nm].

In Step ST100, for the distribution of the height of the raised part 41 of each microlens 31 in a certain microlens set, the maximum difference in height ΔH or ΔD may be set as described above, and the height of the raised part 41 may be set to a given distribution, such as a uniform random array, a pseudo-random array or an ordered array, within that range.

By the method described above, design data of a microlens set having a plurality of microlenses 31 in a single shape can be prepared.

By performing the above-described method repetitively with a variation of some of the basic elements that define the lens shape of the microlenses 31, it is possible to prepare a plurality of types of data of a microlens set where the angle distribution of diffuse light intensity is varied. Although the conditions for determining the height of the raised part 41 that adds a phase difference to the plurality of microlenses 31 may be changed or not changed, which causes no particular problem. By repeating this work, it is possible to prepare microlens sets in two or more types of shapes with different angle distributions of the diffuse light intensity.

Although any of the basic elements can be changed to alter the angle distribution of diffuse light intensity, it is preferred to change the curvature or lens height (lens depth) of the microlenses 31 in consideration of workload when preparing design data.

(Production of Sample Mold)

In Step ST200, a sample mold that is processed to have the shape corresponding to the microlens set is produced from the design data generated in ST100. A processing method may be appropriately selected from machining, photolithography using a mask, maskless photolithography, etching, laser ablation and the like. In this embodiment, a sample mold production process by maskless photolithography is described briefly with reference to FIG. 37.

Figure 37:
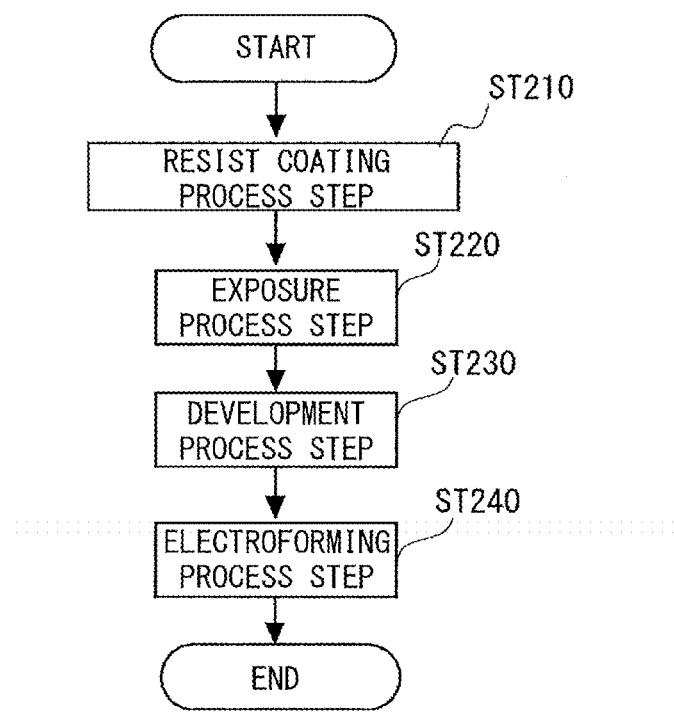
FIG. 37 is a flowchart showing a sample mold production method in the method for producing a diffuser plate according to the first embodiment.

As shown in FIG. 37, photoresist is applied on top of a substrate first (ST210). For example, positive photoresist may be applied onto the substrate by spin coating or the like. The applied resist film may have any thickness as long as it is equal to or more than the lens height of the microlens set to be formed as a diffusion pattern. Prior to the following exposure step, it is preferred to perform baking of the applied resist film at a temperature of 70° to 110° C.

Next, a laser beam is applied to expose the photoresist (ST220). The wavelength of the laser beam is not particularly limited, and it is appropriately selected according to the type of photoresist. The wavelength of the laser beam may be selected from 351 nm, 364 nm, 458 nm, 488 nm (the oscillation wavelength of an Ar+ laser), 351 nm, 406 nm, 413 nm (the oscillation wavelength of a Kr+ laser), 352 nm, 442 nm (the oscillation wavelength of a He—Cd laser), 355 nm, 473 nm (the pulse oscillation wavelength of a semiconductor-pumped solid-state laser), 375 nm, 405 nm, 445 nm, 488 nm (semiconductor laser) and the like, for example.

In the exposure process of the microlens 31 with the raised part 41, a laser scans the resist, modulating the laser power to a value determined by the lens shape and the resist sensitivity, in accordance with the design data of the microlens set. Because the height of the raised part 41 is different between one microlens 31 and the adjacent microlens 31, the laser power is changed in steps at the boundary between them. Laser used for laser exposure is concentrated through an objective lens and brought to a focus on the resist. Because a laser spot has Gaussian distribution with a finite diameter in general, the distribution of the quantity of light exposed to the resist is not step-like even when the laser power is changed in steps, the light exposure distribution has a certain slope also at the boundary of the microlenses 31, and therefore the shape of this part is deviated from the designed shape. A laser beam spot size φ at a focal position is generally represented as φ=k×λ/NA (k: constant of proportionality, λ: wavelength, NA: lens numerical aperture).

A difference in height of the raised part 41 between one microlens 31 and the adjacent microlens 31 becomes larger by increasing a difference in laser power between the microlenses 31 adjacent to each other. However, if a difference in laser power is too large, a region in which the lens shape near the adjacent lens boundary is deviated from the shape designed by optical design becomes larger. Accordingly, the ratio of the microlens 31 having the same angle distribution of diffuse light intensity as other microlenses 31 decreases. Therefore, in order to obtain the angle distribution of diffuse light intensity which is substantially the same as that of the optical design, it is desirable to set a difference in height of the raised part 41 between the adjacent microlenses 31 within a specified range.

In this embodiment, when it is assumed that the height of each microlenses 31 is fixed, the maximum difference in height ΔH of the apex of the convex part of each microlenses 31 coincides with the maximum difference in height of the raised part 41. When the above-described phase difference normalized by wavelength is 1, and the height of the raised part 41 is a uniform random array, the average of phase differences of the microlenses 31 is 0.5. Thus, the microlens set has a phase difference of ½ wavelength on average, which is desirable because the effects of interference and diffraction are suppressed more effectively.

After that, the photoresist after exposure is developed (ST230). The development of the photoresist may be performed by way of application of a developer, immersion in a developer and the like. Although the developer may be an alkaline developer such as tetramethylammonium hydroxide (TMAH), it should be determined according to the type of the photoresist and is not limited to an alkaline developer. In the case of developing the positive resist, the photoresist is removed depending on light exposure, and a concave-convex pattern is thereby formed in the photoresist.

Then, a nickel mold is formed by electroforming (ST240). Specifically, nickel is grown into plate form by electroforming (electrolytic plating) on the photoresist surface with the concave-convex pattern. After electroforming, the nickel plate is separated from the photoresist master, and thereby a nickel mold (stamper) to which the concave-convex pattern on the photoresist is inversely transferred is obtained.

(Production of Sample Diffuser Plate)

As shown in FIG. 35, after Step ST200, the concave-convex pattern on the surface of the mold obtained in ST200 is transferred to a resin base, and a sample diffuser plate having one type of diffusion pattern of the microlens set is produced (ST300). As a molding method, roll-to-roll molding, thermal press molding, molding using ultraviolet curable resin, injection molding or the like is suitable for use.

As the resin base, a resin sheet having ionization radiation transmissivity and flexibility is preferred for use, although it depends on the application of the diffuser plate 10 as a final product. Although the thickness of the resin substrate is not particularly limited, it may be a thin sheet of about 50 to 500 μm Examples of the material of the resin base when producing a transmissive diffuser plate include polyester such as polyethylene terephthalate and polyethylene naphthalate, polymer of methacrylic acid or acrylic acid esters (so-called acrylic resin) such as polymethylmethacrylate, polymethylacrylate and polyethylacrylate, polycarbonate, cellulose triacetate, polystyrene, polypropylene, or a composition with a mixture of prepolymer, oligomer or monomer having polymerizable unsaturated bond or epoxy group in molecule.

Examples of prepolymer and oligomer are unsaturated polyesters such as unsaturated dicarboxylic acid and polyhydric alcohol condensate, epoxy resin, methacrylates such as polyester methacrylate and polyether methacrylate, polyester acrylate, epoxy acrylate, urethane acrylate, polyether acrylate, polyol acrylate or melamine acrylate and the like.

In the case of thermal press molding, an acrylic sheet is heated and pressed using the above-described stamper, and thereby the micropattern of a convex lens shape is transferred to the acrylic sheet. As a result, a microlens set member by the concave lens can be produced. If double-sided molding where stampers are placed on both sides is employed, it is possible to make a member in which microlens sets are formed on both sides. Resin to be used for molding is not limited to acrylic, and resin that can be used for the diffuser plate 10 may be selected according to the conditions for molding.

Figure 4:
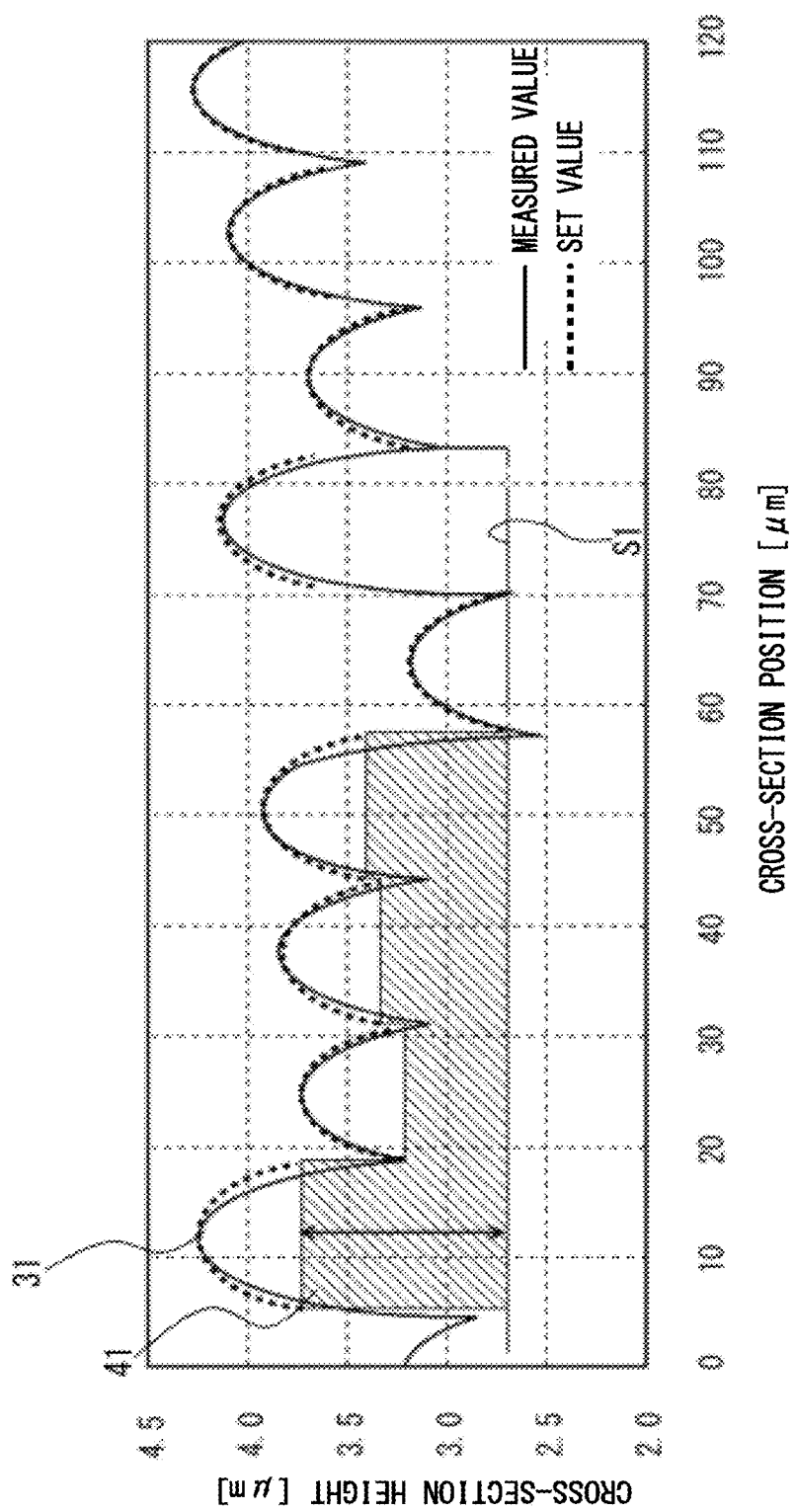
FIG. 4 is a view showing an example of measurement results of the cross-sectional profile of a convex lens in the diffuser plate (when a curvature radius is 42 μm, a pitch is 13 μm, and ΔH 1.5 μm.

FIG. 4 is a view showing results of measuring, with a laser microscope, the cross-sectional profile of the microlens 31, which is a part of the microlens set of a nickel stamper according to this embodiment. In FIG. 4, a designed value of the lens shape is indicated by a dotted line, and a measured value is indicated by a solid line. For some microlenses 31 in FIG. 4, a set value of the raised part 41 is indicated by hatching. In this example, the lens part of the microlens 31 is a spherical lens with a curvature radius of 42 μm, the lens pitch is 13 μm, and the maximum difference in height of the apex of the convex part of each microlens 31 is ΔH=1.5 μm.

In each of the microlenses 31 of the microlens set in FIG. 4, the maximum value of the proportion of the lens part that does not coincide with the optical design shape is about 30% of the cross-sectional profile, which shows that there is an error between design and an actual product. Particularly, if the pitch of the microlens 31 is narrow, the effect of a laser beam diameter becomes relatively greater, and therefore it is necessary to repeat the loop of design and trial production in order to produce the diffuser plate 10 in the designed shape, resulting in heavy workload.

(Evaluation of Sample Diffuser Plate)

As shown in FIG. 35, after Step ST300, the optical properties of each of a plurality of types of sample diffuser plates produced in Step ST300 are evaluated (ST400). The evaluation of the optical properties of the diffuser plates, in particular, the angle distribution of diffuse light intensity, is performed by the following way. The evaluation of the diffuser plate 10 that is produced as a final product, not only the evaluation of the sample diffuser plates, can be performed in the same way.

Parallel light obtained by collimating a He—Ne laser light source is input to the produced diffuser plate, and a diffuse image of outgoing light that is output from the diffuser plate to a screen is a He—Ne laser diffuse image. It is assumed that the angle distribution of diffuse light intensity of the diffuser plate is obtained from the He—Ne laser diffuse image. In one example, a photograph of the He—Ne laser diffuse image may be taken, and the diffuse light intensity on the photograph may be read out. In another example, the angle distribution properties of the diffuse light intensity of the diffuser plate may be measured by a luminance meter and a goniometer stage using white light by a halogen light as a light source. In the case where the diffuser plate is the sample diffuser plate by the microlens set composed of single-type microlenses 31, variations in intensity (variations in luminance) due to diffraction and interference are observed in no small measure.

The experimental results by the inventors of the present invention revealed that, if the shape of the lens surface of the microlens 31 is the same, the angle position at which the peaks and troughs of variations in intensity occur does not substantially change regardless of a change in the way of adding a phase difference by the raised part 41. On the other hand, the angle positions of the peaks and troughs can be varied by changing the shape, such as the curvature and height, of the microlens 31. In this embodiment, as a result of preparing a plurality of microlens sets where some of basic elements that define the shape of the microlens 31 are varied, it is possible to prepare a plurality of sample diffuser plates where the positions of the peaks and troughs of the angle distribution of diffuse light intensity are different.

Figure 5:
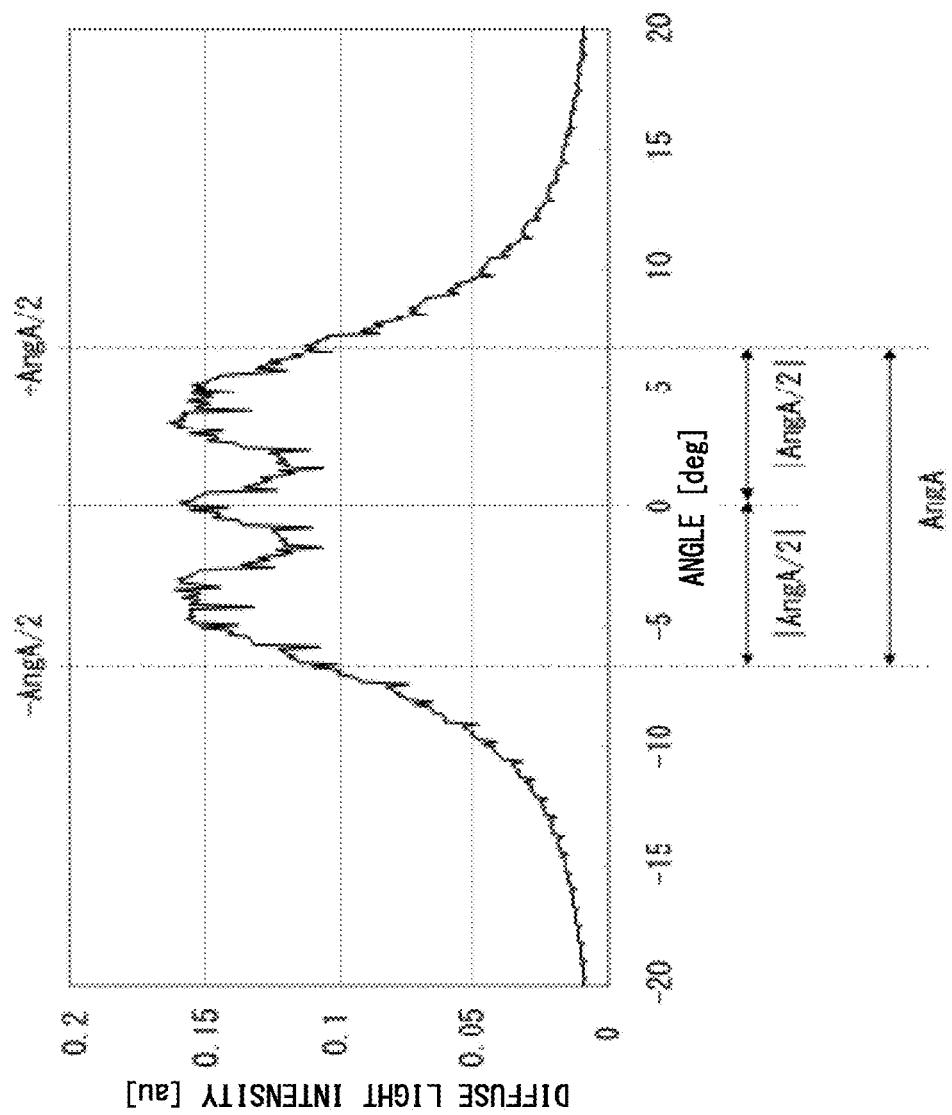
FIG. 5 is a view showing the definition of a desired angle range.

Note that, as for the angle distribution of diffuse light intensity obtained from the He—Ne laser diffuse image in the microlens set or the diffuser plate, the same optical axis direction as incident light is a diffusion angle of 0°, one direction in the angle distribution measurement direction is positive, and the opposite direction is negative as shown in FIG. 5. The range of the angle centering on the optical axis where a designer desires to maintain the substantially uniform diffuse light intensity in the diffuser plate is a desired angle range. The desired angle range in the diffuser plate is defined as AngA where the absolute value of the maximum value on the positive side and the maximum value on the negative side is |AngA/2| when the positive side and the negative side with respect to the optical axis are symmetrical in shape. The value of AngA is set for each diffuser plate according to the intended use and purpose. It is assumed that the range of AngA in the diffuser plate 10 according to this embodiment is 0°≤AngA≤40°. In the case where a desired angle range of a designer is unknown, the following angle range is used as a desired angle range. Specifically, it is the maximum angle range where the standard deviation of the relative intensity of diffuse light intensity in a certain angle range is equal to or less than $9.00 \times 10^{-2}$ when the arithmetic average of the diffuse light intensity in the certain angle range is 1.

The arithmetic average $L_{ave}$ of the light intensity in the desired angle range (AngA) is defined by the following expression (5). When $L_i$ is the diffuse light intensity corresponding to the i-th angle, $L_1$ is the negative maximum value (=−AngA/2) in the desired angle range (AngA) when i=1, and $L_n$ is the positive maximum value (=+AngA/2) in the desired angle range (AngA) when i=n.

$$L_{ave} = \frac{1}{n}\sum_{i=1}^{i=n} L_i \qquad (5)$$

The relative intensity $L_{ave}'$ which is 90% of the arithmetic average $L_{ave}$ of the light intensity in the desired angle range (AngA) is defined by the following expression (6).

$$L_{ave}' = 0.9 \times L_{ave} \qquad (6)$$

Figure 6:
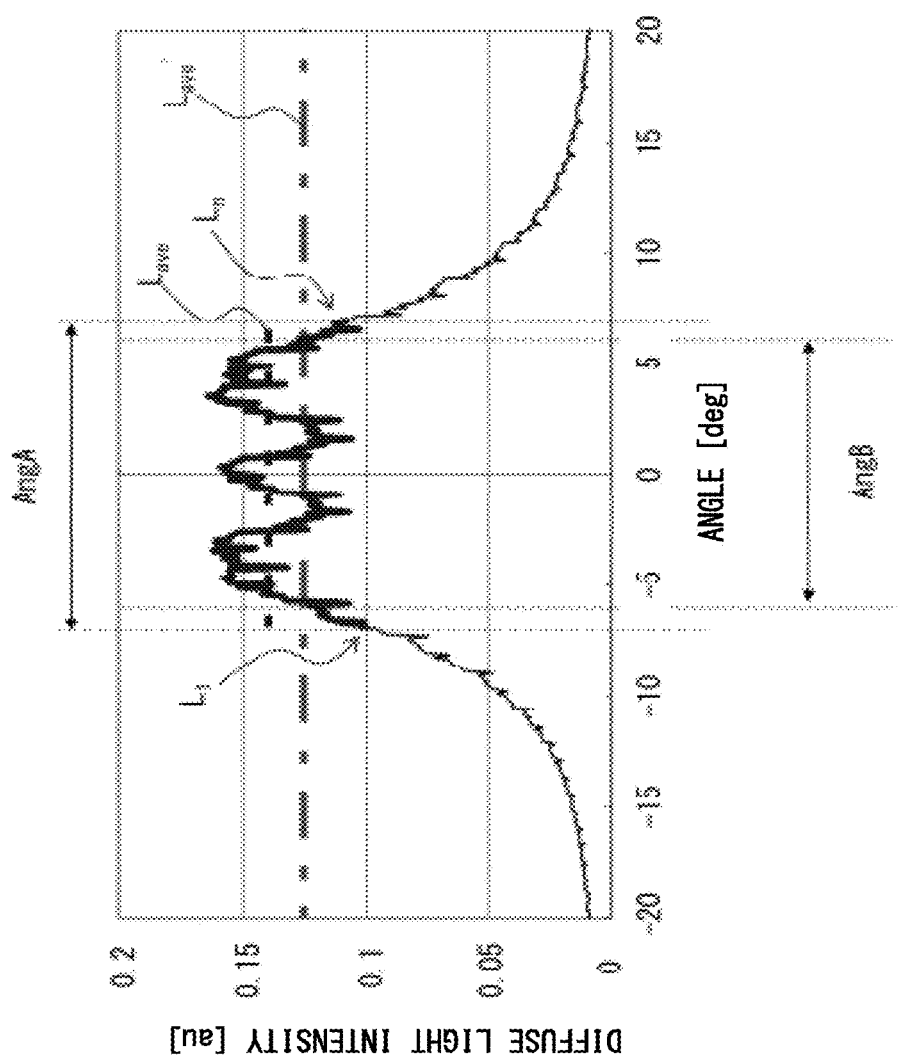
FIG. 6 is a view showing the definition of an angle range in which the diffuse light intensity is substantially uniform.

As shown in FIG. 6, the angle range (AngB) where the diffuse light intensity in the diffuser plate 10 is substantially uniform is a difference between the diffusion angle at which the absolute value reaches its maximum on the positive side and the diffusion angle at which the absolute value reaches its maximum on the negative side, out of the diffusion angles with the relative intensity $L_{ave}'$ of 90% with respect to the arithmetic average $L_{ave}$ of the diffuse light intensity in the desired angle range (AngA).

(Process Step of Designing Microlens Array Combining Selected Microlens Sets of Sample Diffuser Plates)

As shown in FIG. 35, after Step ST400, a microlens array that combines a plurality of types of microlens sets is designed based on the evaluation results of each of the plurality of types of sample diffuser plates (ST500). In Step ST500, a microlens array that combines a plurality of types of microlenses 31 that constitute the above-described plurality of types of microlens sets is designed in order to improve the angle distribution of diffuse light intensity of the diffuser plate 10. Step S500 is described in detail hereinafter with reference to FIG. 38.

Figure 38:
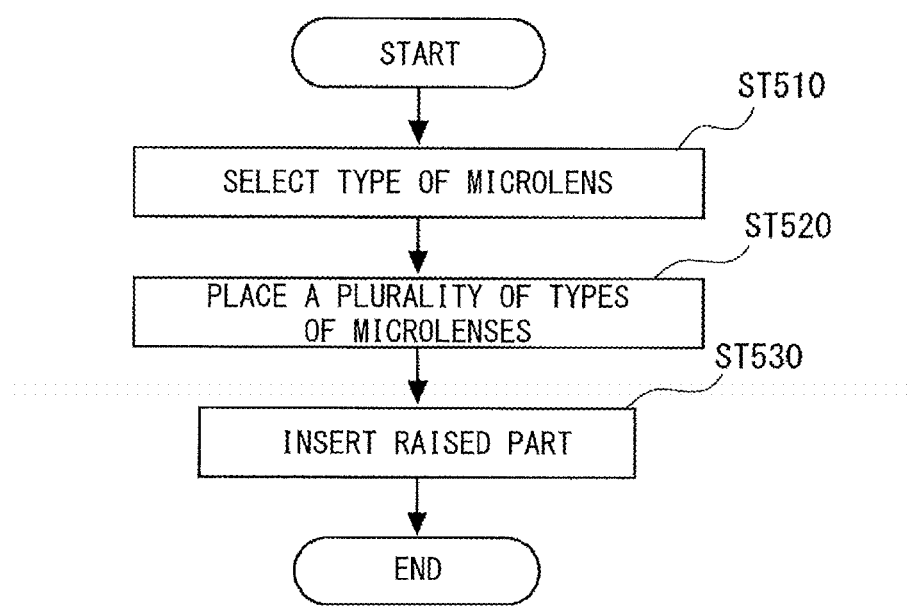
FIG. 38 is a flowchart showing a microlens array design method in the method for producing a diffuser plate according to the first embodiment.

As shown in FIG. 38, the shape types of the microlens 31 to be used for the microlens array are selected from a plurality of types of microlens sets (ST510). In this step, by comparing the evaluation results of the plurality of types of sample diffuser plates in Step ST400, a combination of types where variations in intensity occurring when averaging the angle distribution of diffuse light intensity of two or more types of sample diffuser plates are improved compared with variations in intensity in the angle distribution of diffuse light intensity of a single sample diffuser plate is selected. Then, the shapes of the microlenses 31 in the selected sample diffuser plates are used for the design of the microlens array. At this time, a combination in which the positions of the peaks and troughs of the diffuse light intensity in the desired angle range (AngA) are balanced out is selected based on the evaluation results of the angle distribution of diffuse light intensity in each of the sample diffuser plates.

Variations in intensity in the angle distribution of diffuse light intensity of the diffuser plate, which are variations in luminance in this embodiment, are quantitatively defined as follows.

The angle distribution of diffuse light intensity of the diffuser plate having one certain type of microlens set is considered. When the arithmetic average ($L_{ave}$) of the diffuse light intensity in the desired angle range (AngA) is 1, variations in intensity are defined as the standard deviation of the relative intensity of the diffuse light intensity in the desired angle range. In other words, variations in luminance ($L_{STD}$) are defined by the following expression (7), where $L_i/L_{ave}$ is the relative intensity of diffuse light intensity.

$$L_{STD} = \sqrt{\frac{1}{n}\sum_{i=1}^{i=n}\left(1 - \frac{L_1}{L_{ave}}\right)^2} \qquad (7)$$

In the design of a microlens array that combines the microlenses 31 with two or more types of lens shapes, the pitch and the undersurface shape of all microlenses 31 are preferably identical because the design can be simplified. In this case, it is preferred to combine the microlenses 31 with different curvature or lens height (depth d for concave lens) out of the basic elements that define the shape of the microlenses 31.

As shown in FIG. 38, after Step ST510, the microlenses 31 with the two or more types of lens shapes selected in ST510 are placed on the reference surface S1 (ST520). The microlenses 31 with the selected two or more types of lens shapes may be placed in the plane (the reference surface S1) by randomly selecting a lens shape of the microlens 31 or by selecting a type of the microlens 31 according to a specified rule for the position to be placed.

It is preferred to select a type of the microlens 31 according to a specified rule for the position where the microlens 31 is to be placed and place the selected the microlens 31 at a predetermined position on the reference surface S1. In this case, one type of microlens 31 may be selected from a plurality of types in accordance with a value of a function $U_{x,y}$, which is an algebraic function, an elementary function or a composite function of them, with the central coordinates (x,y) on the undersurface of the microlens 31 to be placed as a representative point.

The algebraic function is a rational function and an irrational function. The elementary function is a polynomial function where a complex number is a variable, an exponential function, or a function that can be represented by the four arithmetic operations and composition of a logarithmic function principal value. A trigonometric function, a hyperbolic function, and an inverse function principal value of them are also included in the elementary function. Further, the composite function is a function that combines at least two functions out of functions included in the algebraic function and the elementary function by four arithmetic operations. Further, when selecting and placing the microlens 31, the microlens 31 may be selected using functions $U_x$ and $U_y$ that are different in each of the x-direction and the y-direction, instead of the function $U_{x,y}$ where a composite value of the x-coordinate and the y-coordinate is an independent variable.

For example, in the case of selecting three types (A1, A2, A3) of microlenses 31 with different angle distribution of diffuse light intensity and forming a microlens array, using the function $U_{x,y}$ of the following expression (8), the microlens A1 is selected in the coordinates (x,y) where the value of $U_{x,y}$ is −1 to −0.33, the microlens A2 is selected in the coordinates (x,y) where it is −0.33 to 0.33, the microlens A3 is selected in the coordinates (x,y) where it is 0.33 to 1.00, and they are placed. In the following expression (8), p1, p2, p3, Xb1 and Yb1 are constants, and (x,y) is the central coordinates on the undersurface of the microlens.

$$U_{x,y}=\cos(p1\sqrt{p2\times(x-Xb1)^2+p3(y-Yb1)^2}) \quad (8)$$

As shown in FIG. 38, after Step ST520, the raised part 41 is inserted between the two or more types of microlenses 31 placed in Step ST520 and the reference surface S1 (ST530). The height $H_{x,y}$ or the depth $D_{x,y}$ of the raised part 41 in each microlens 31 vary randomly or regularly within the range of the predetermined maximum difference in height ΔH or ΔD. It is thereby possible to add a phase difference to the plurality of microlenses 31. For example, in the case of regularly varying the phase difference of the plurality of microlenses 31, the height $H_{x,y}$ or the depth $D_{x,y}$ of the raised part 41 is varied in accordance with an algebraic function, an elementary function or a composite function of them where the coordinates in which the microlens 31 is placed are independent variables. It is thereby possible to easily suppress variations in luminance due to so-called diffraction spots caused by diffraction and interference.

To be specific, the coordinates (x,y) with the x-axis and the y-axis are first set on the reference surface S1, and $H_{x,y}$ or $D_{x,y}$ for (x,y) is calculated using a computer. A function for determining the height $H_{x,y}$ or the depth $D_{x,y}$ of the raised part 41 in each microlens 31 may be selected appropriately from an algebraic function, an elementary function and a composite function of them. At this time, the functions $H_x$, $H_y$, $D_x$, $D_y$ that are different in each of the x-direction and the y-direction may be selected, or the function $H_{x,y}$ or $D_{x,y}$ where a composite value of the x-coordinate and the y-coordinate is an independent variable may be selected.

For example, by setting the central coordinates (x,y) on the undersurface of the microlens 31 as a representative point and defining $H_{x,y}$ or $D_{x,y}$ of the microlens 31 by the following expression (9) or expression (10), it is possible to determine $H_{x,y}$ and $D_{x,y}$ in each coordinates (see FIG. 1 and FIG. 2). In the following expressions, a1, a2, b1, b2, c1, c2, Xa1, Ya1, Xa2, Ya2 are constants, and (x,y) is the central coordinates on the undersurface of the microlens 31.

$$H_{x,y}(D_{x,y})=a1\times\sin(b1\sqrt{(x-Xa1)^2+(y-Ya1)^2}+c)+d \quad (9)$$

$$H_{x,y}(D_{x,y})=a1\times\sin(b1\sqrt{(x-Xa1)^2+(y-Ya1)^2}+c)+a2\times\sin(b2\sqrt{(x-Xa2)^2+(y-Ya2)^2}+c2)+d \quad (10)$$

Further, in order to vary the maximum difference in height ΔH or ΔD, besides inserting the raised part 41, a substrate with a thickness varying in accordance with the function $H_{x,y}$ or $D_{x,y}$ may be used in place of a flat substrate, or a substrate with a varying thickness may be used in combination with the raised part 41.

Then, it is checked whether the microlens array composed of a combination of the microlenses 31 in two or more types of shapes according to this embodiment which is designed in the above manner is designed to satisfy at least the following conditions (a) to (c).

(a) Variations in luminance ($L_{STD}$) of the microlens array composed of a combination of the microlenses 31 in two or more types of shapes are smaller than variations in luminance ($L_{STD}$) actually measured in each sample diffuser plate composed of one type of microlens set.

(b) Variations in luminance ($L_{STD}$) of the microlens array composed of a combination of the microlenses 31 in two or more types of shapes are equal to or less than $9.00\times10^{-2}$.

(c) The angle range (AngB) where the diffuse light intensity is substantially uniform in the microlens array composed of a combination of the microlenses 31 in two or more types of shapes satisfies the following expression (11).

$$0.9\times\mathrm{Ang}A(°)\leq\mathrm{Ang}B(°)\leq1.1\times\mathrm{Ang}A(°) \quad (11)$$

The condition (a) indicates that variations in luminance are improved by combining the microlenses 31 in two or more types of shapes. The condition (b) is a target value of variations in luminance in the diffuser plate 10 according to this embodiment, and variations in luminance $L_{STD}$ of the microlens array composed of a combination of the microlenses 31 in two or more types of shapes are preferably equal to or less than $9.00\times10^{-2}$ and more preferably equal to or less than $7.00\times10^{-2}$.

Further, an object of this embodiment is to obtain the diffuser plate 10 with small variations in luminance in a desired angle range. Therefore, if the angle range (AngB) where the diffuse light intensity is substantially uniform is largely deviated from the desired angle range (AngA), it is not preferable as a product. Thus, it is required to satisfy the condition (c) as a criterion in this embodiment. When at least one of the above-described conditions (a) to (c) is not satisfied, design is performed again, and when all of them are satisfied, the process proceeds to the next step.

As shown in FIG. 35, after Step ST500, a diffusion pattern mold having the shape corresponding to the microlens array is produced (ST600). The diffusion pattern mold in the shape corresponding to the microlens array composed of a combination of the microlenses 31 in two or more types of shapes designed in Step ST500 is produced by maskless photolithography which is the same as the one performed in the above-described sample mold production process (ST200).

After that, the diffusion pattern is transferred to resin by using the diffusion pattern mold produced in Step S600 (ST700). The diffuser plate 10 where the diffuse light intensity is substantially uniform in the desired angle range which is determined in the design stage is thereby produced.

In order to obtain a convex lens microlens array member, a stamper in which a concave lens microlens array shape is formed may be produced by replication electroforming using the stamper with a convex lens shape obtained in the electroforming process as a mold, and thermal press molding of resin may be performed using that stamper. Although a method that exposes resist by modulation of the exposure power corresponding to a convex lens in the maskless lithography exposure process may be used, the above-described method that performs replication electroforming of the stamper in the electroforming process is easier.

In the case of producing a reflective diffuser plate, an aluminum reflective coating may be vacuum-deposited on the surface of a resin member where the microlens array is formed, for example. Incidence light can be thereby reflected on the aluminum surface. Further, the microlens array may be formed only on one surface of a substrate, and an aluminum reflective coating may be formed on the microlens array surface. In this case, light is incident to the flat surface side of the substrate and reflected on the aluminum reflective coating on the microlens array surface.

On the other hand, an aluminum reflective coating may be formed on the flat surface side, not on the microlens array surface. Specifically, the following structure can be also used as the diffuser plate: light is incident to the microlens array surface where the reflective coating is not formed, and reflected on the flat surface side where the reflective coating is formed. Further, a substrate where microlens arrays are formed on both sides may have a structure in which the thickness of a reflective coating on the incidence side is adjusted to function as a half mirror and the underside surface has a reflectivity of substantially 100%, so that it serves as the diffuser plate with two microlens arrays on both of the front and back surfaces. A protective coating may be further formed to protect the aluminum reflective coating where needed.

EXAMPLE (Preliminary Experiment Using Sample Diffuser Plate)

Example of the transmissive diffuser plate 10 according to this embodiment where the desired angle range (AngA) was set to 14° are described hereinafter. Four types of sample diffuser plates were produced first based on the above-described process steps. Each of the microlens sets of the four types of sample diffuser plates was composed of single-type microlenses 31 having a toroidal lens shape where the curvature radius is different between the x-direction and the y-direction. For all of the plurality of microlenses 31 in the four types of sample diffuser plates, the pitch in the x-direction was Px=22 μm, the pitch in the y-direction was Py=22 μm, and the undersurface of the microlens 31 was square.

Microlenses A, B, C and D with difference shapes were used as the microlenses 31. The curvature radius was Rx=39 μm and Ry=41 μm in the microlens A, Rx=42 μm and Ry=44 μm in the microlens B, Rx=35 μm and Ry=37 μm in the microlens C, and Rx=32 μm and Ry=34 μm in the microlens D, where Rx was the curvature radius in the x-direction, and Ry was the curvature radius in the y-direction. The height of the raised part 41 was ΔH=1.5 μm from $1000 \times \Delta H \times (n-1) \div \lambda = 1$ so that an optical path difference caused by the maximum difference in height ΔH of the plurality of microlenses was 1 wavelength when a member refractive index n=1.5 and a use wavelength λ=750 nm.

Because the microlenses A, B, C and D have different shapes, the angle distribution of diffuse light intensity in the sample diffuser plate where one of the microlenses A, B, C and D is placed on the principal surface is different from each other. FIGS. 7 to 10 show the measured values of the angle distribution of diffuse light intensity in the x-axis direction of the four types of different sample diffuser plates, each in which one type microlenses out of the microlenses A, B, C and D were placed on the principal surface. The quantity ratio of the microlenses in FIGS. 7 to 10 was A:B:C:D=1:0:0:0 in FIG. 7, A:B:C:D=0:1:0:0 in FIG. 8, A:B:C:D=0:0:1:0 in FIG. 9, and A:B:C:D=0:0:0:1 in FIG. 10.

Figure 7:
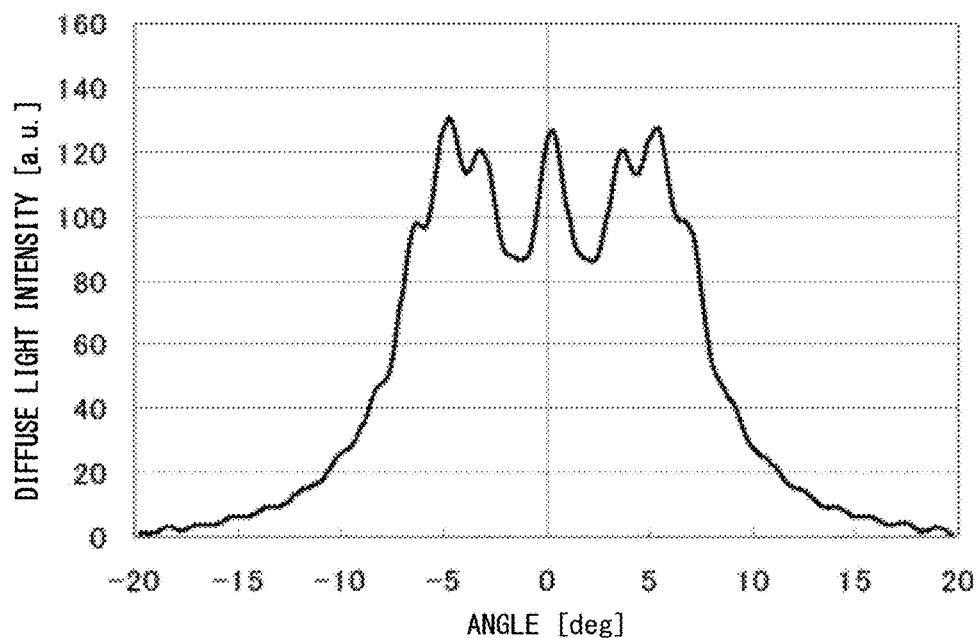
FIG. 7 is a view showing measured values (comparative example 1) of the angle distribution of diffuse light intensity in the x-axis direction of a sample diffuser plate in which a plurality of only microlenses A are placed.
Figure 8:
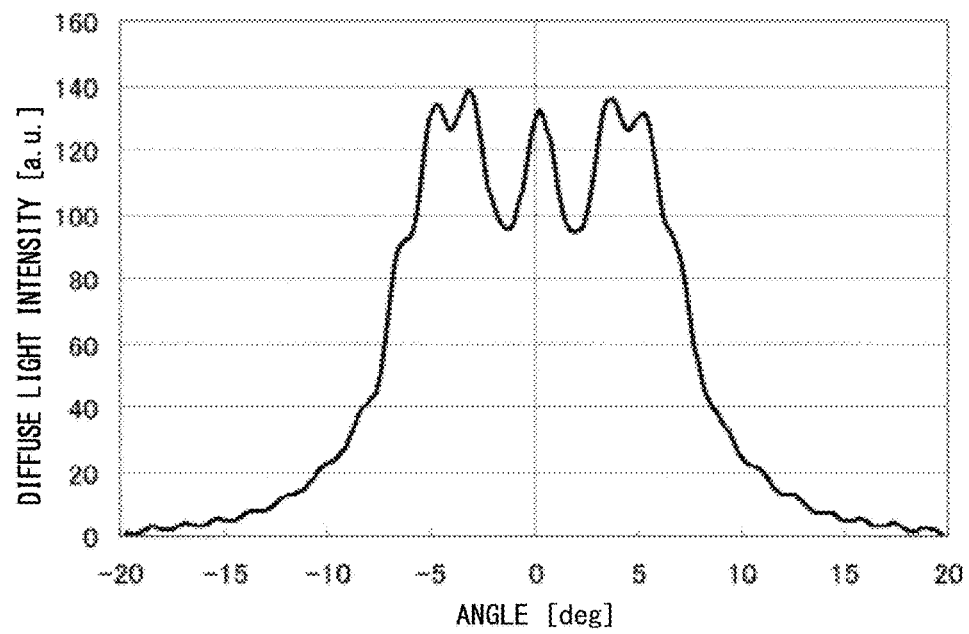
FIG. 8 is a view showing measured values of the angle distribution of diffuse light intensity in the x-axis direction of a sample diffuser plate in which a plurality of only microlenses B are placed.
Figure 9:
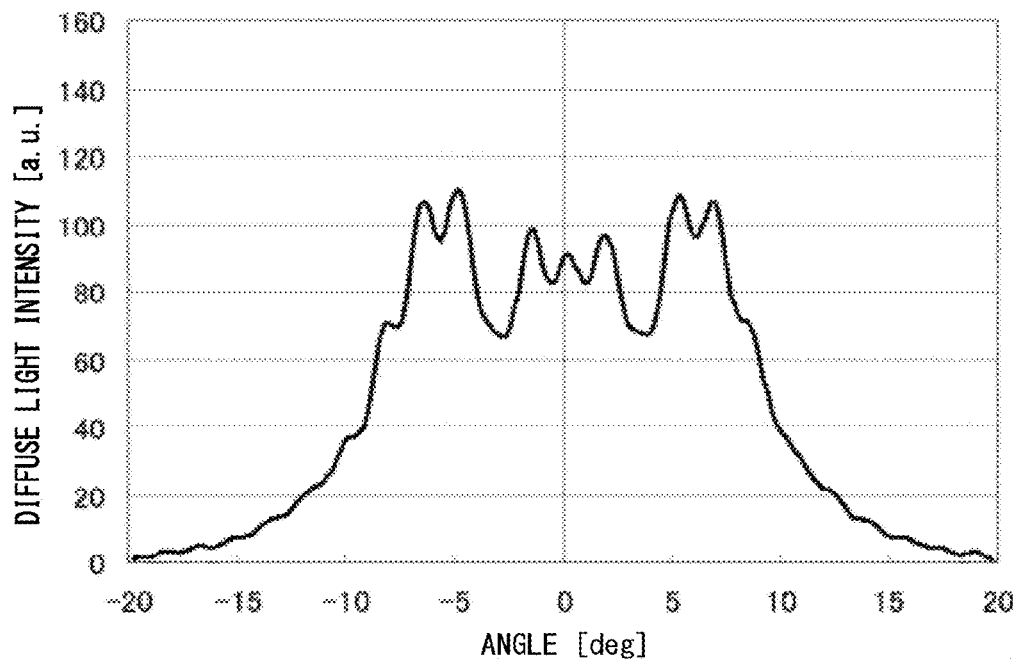
FIG. 9 is a view showing measured values of the angle distribution of diffuse light intensity in the x-axis direction of a sample diffuser plate in which a plurality of only microlenses C are placed.
Figure 10:
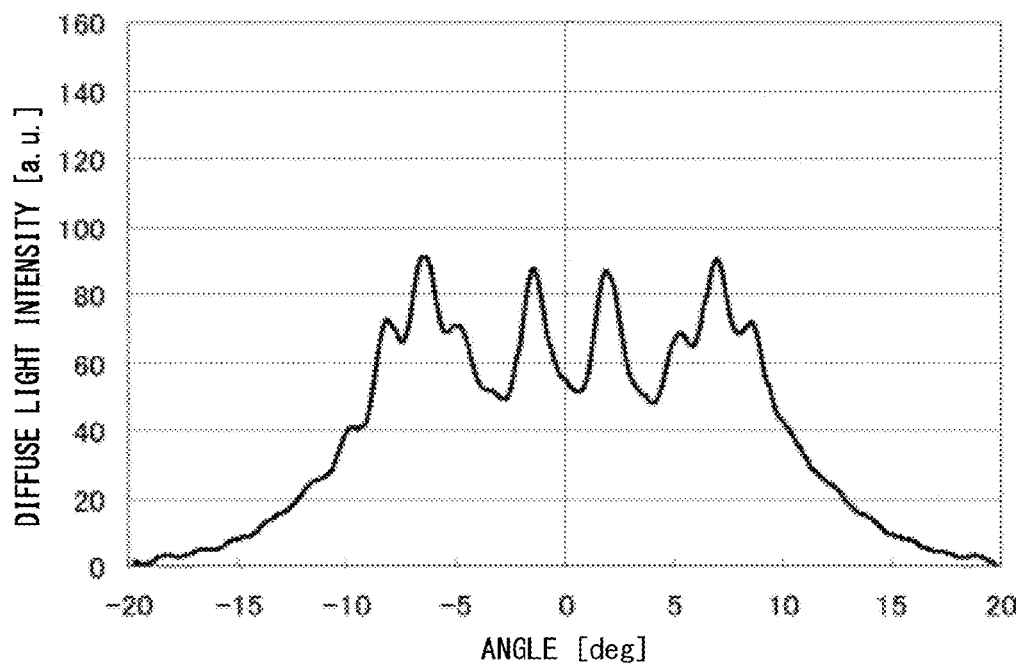
FIG. 10 is a view showing measured values (comparative example 2) of the angle distribution of diffuse light intensity in the x-axis direction of a sample diffuser plate in which a plurality of only microlenses D are placed.

Thus, FIG. 7 shows the measured values of the angle distribution of diffuse light intensity in the sample diffuser plate having the microlens set with the microlens A, FIG. 8 shows the measured values n the sample diffuser plate having the microlens set with the microlens B, FIG. 9 shows the measured values n the sample diffuser plate having the microlens set with the microlens C, and FIG. 10 shows the measured values n the sample diffuser plate having the microlens set with the microlens D.

Note that the angle distribution of diffuse light intensity in the x-axis direction of each of the sample diffuser plates was calculated from a photograph of a He—Ne laser diffuse image taken for each sample diffuser plate. The diffuse light intensity at an diffusion angle of x (°) was calculated in the range of y=0.5° to y=−0.5° on the He—Ne laser diffuse image photograph. The diffuse light intensity was calculated by changing the diffusion angle x by 0.1° each.

Specifically, the arithmetic average of the diffuse light intensity at 11 points where $x=0.1 \times n'°$ (n': given integer) and y=−0.5°, −0.4°, −0.3°, −0.2°, −0.1°, 0°, 0.1°, 0.2°, 0.3°, 0.4° and 0.5° was the diffuse light intensity at $x=0.1 \times n'°$. The diffuse light intensity was calculated in the range of x=−20° to 20° to obtain the angle distribution of diffuse light intensity in the x-axis direction. A method of calculating the profile of the angle distribution of diffuse light intensity according to the present invention, however, is not limited to above.

The results shown in FIGS. 11 to 15 were obtained by averaging the angle distribution of diffuse light intensity of the four types of sample diffuser plates obtained in the above manner at the quantity ratio of the microlenses A to D. The quantity ratio of the microlenses A to D in FIGS. 11 to 15 was A:B:C:D=0:1:1:0 in FIG. 11, A:B:C:D=0:1:1:1 in FIG. 12, A:B:C:D=0:1:3:2 in FIG. 13, A:B:C:D=1:0:1:1 in FIG. 14, and A:B:C:D=1:1:1:1 in FIG. 15.

Table 1 shows the variations in luminance $L_{STD}$, the angle range (AngB) where the diffuse light intensity is substantially uniform, and the corresponding angle distribution diagram of diffuse light intensity when the ratio of the number of the microlenses A, B, C and D was changed.

TABLE 1

Figure 11:
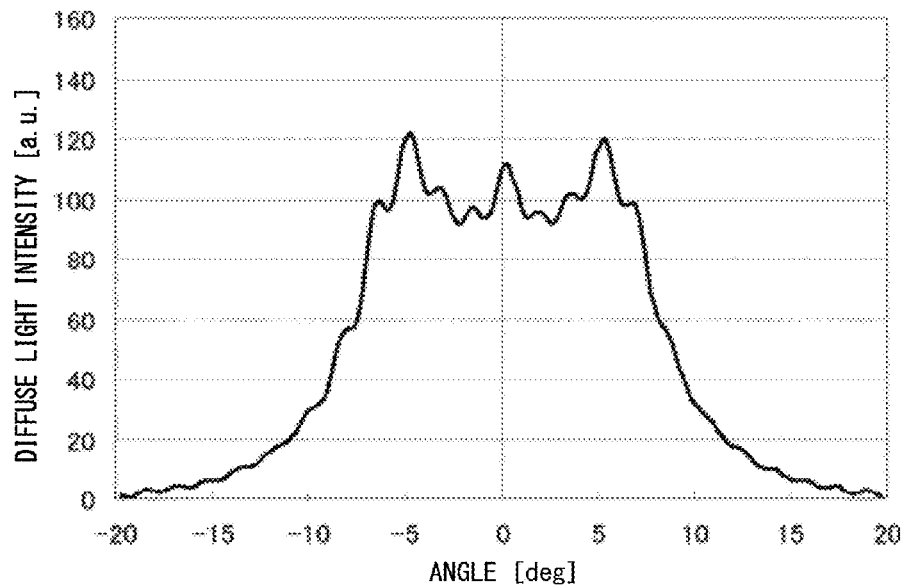
FIG. 11 is a view showing calculated values of the angle distribution of diffuse light intensity obtained by averaging the angle distribution of diffuse light intensity of four types of diffuser plates at a quantity ratio of 0:1:1:0 based on measured values of the angle distribution of diffuse light intensity in the x-axis direction of each diffuser plate in which only one type of microlens out of microlenses A, B, C and D are placed.
Figure 12:
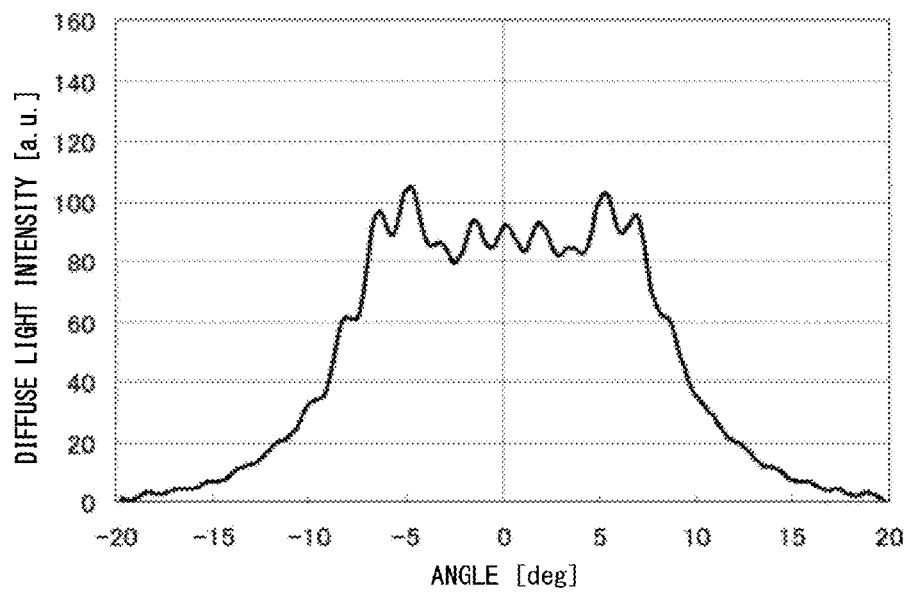
FIG. 12 is a view showing calculated values of the angle distribution of diffuse light intensity obtained by averaging the angle distribution of diffuse light intensity of four types of diffuser plates at a quantity ratio of 0:1:1:1 based on measured values of the angle distribution of diffuse light intensity in the x-axis direction of each diffuser plate in which only one type of microlens out of microlenses A, B, C and D are placed.
Figure 13:
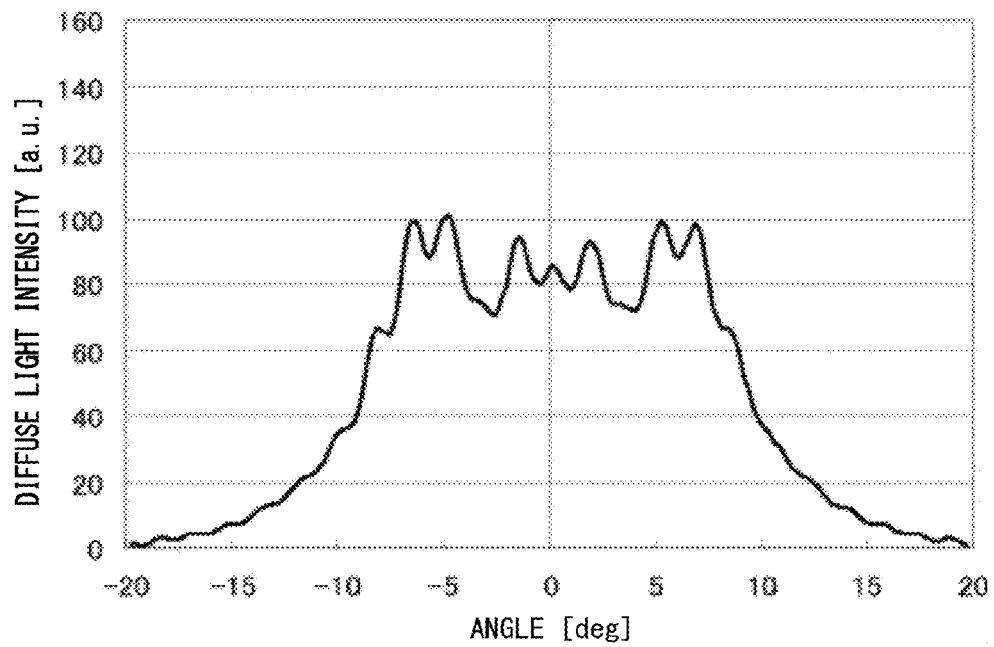
FIG. 13 is a view showing calculated values of the angle distribution of diffuse light intensity obtained by averaging the angle distribution of diffuse light intensity of four types of diffuser plates at a quantity ratio of 0:1:3:2 based on measured values of the angle distribution of diffuse light intensity in the x-axis direction of each diffuser plate in which only one type of microlens out of microlenses A, B, C and D are placed.
Figure 14:
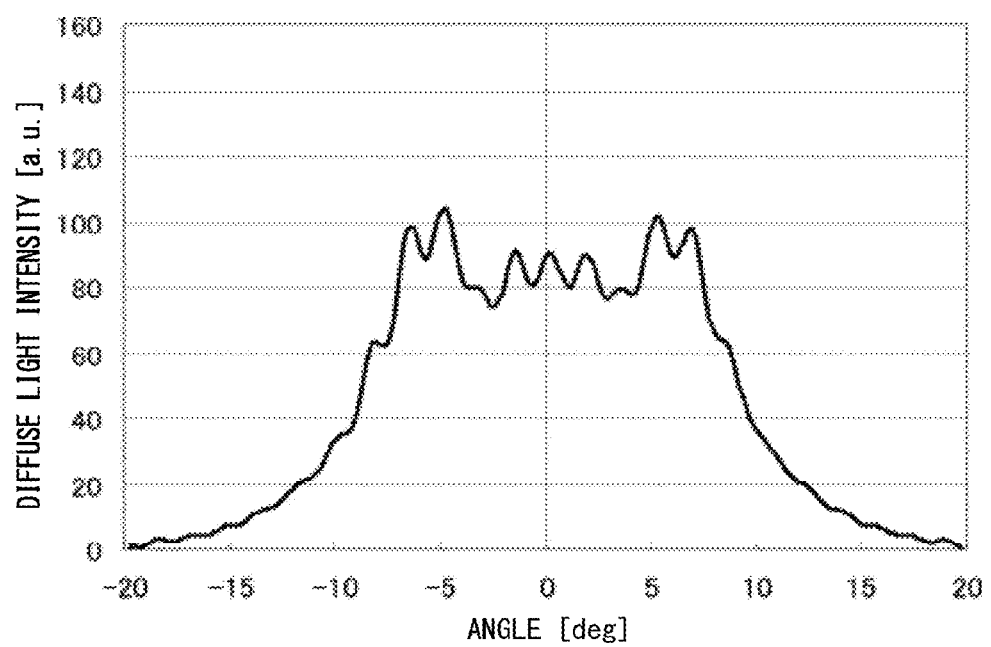
FIG. 14 is a view showing calculated values of the angle distribution of diffuse light intensity obtained by averaging the angle distribution of diffuse light intensity of four types of diffuser plates at a quantity ratio of 1:0:1:1 based on measured values of the angle distribution of diffuse light intensity in the x-axis direction of each diffuser plate in which only one type of microlens out of microlenses A, B, C and D are placed.
Figure 15:
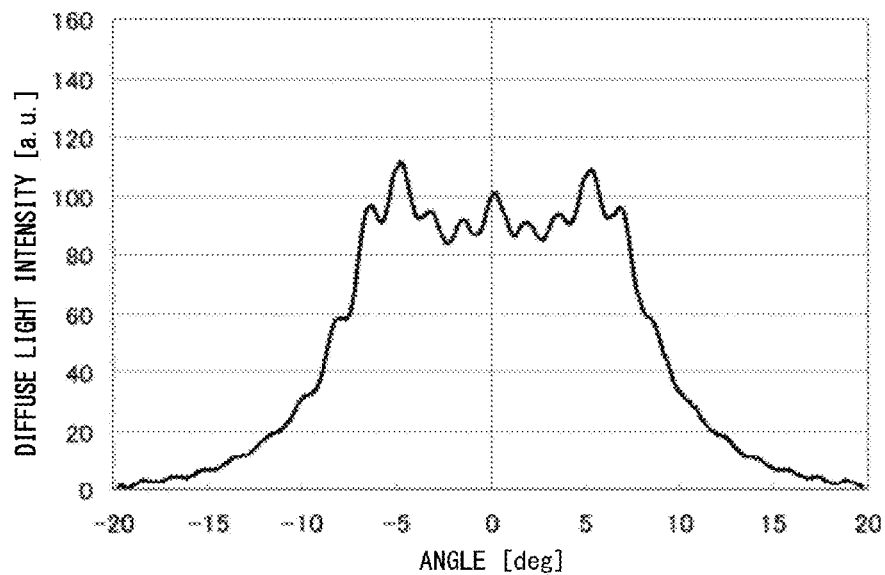
FIG. 15 is a view showing calculated values of the angle distribution of diffuse light intensity obtained by averaging the angle distribution of diffuse light intensity of four types of diffuser plates at a quantity ratio of 1:1:1:1 based on measured values of the angle distribution of diffuse light intensity in the x-axis direction of each diffuser plate in which only one type of microlens out of microlenses A, B, C and D are placed.
Figure 16:
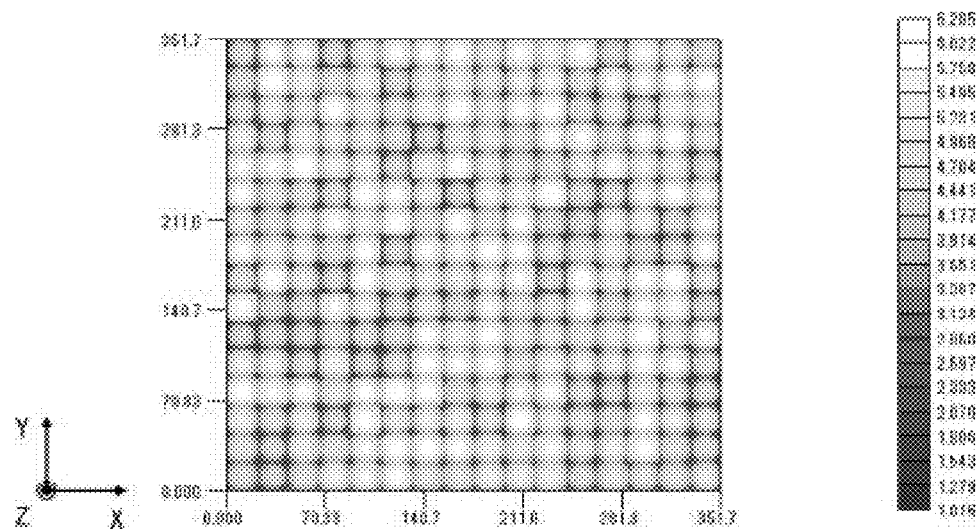
FIG. 16 is a view showing the height distribution of a microlens array according to an example 1.
Figure 17:
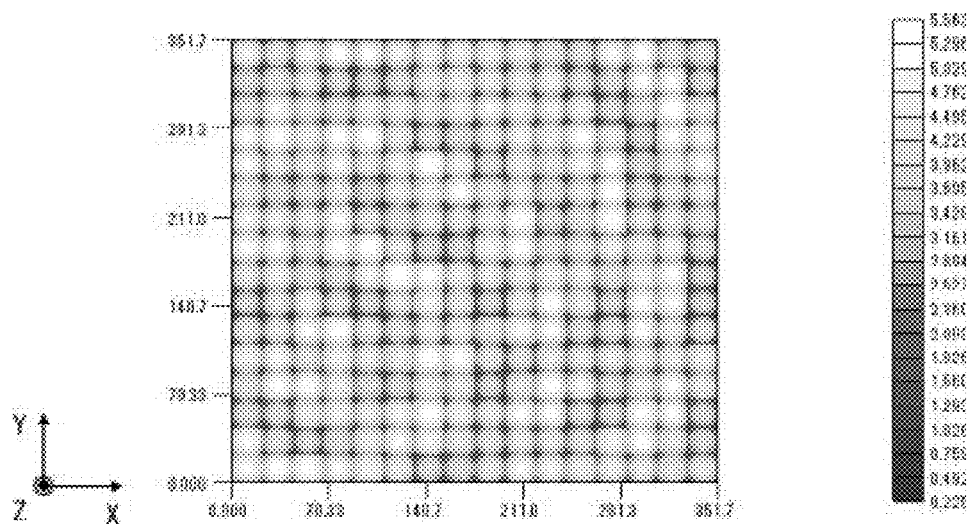
FIG. 17 is a view showing the height distribution of a microlens array according to an example 2.
Figure 18:
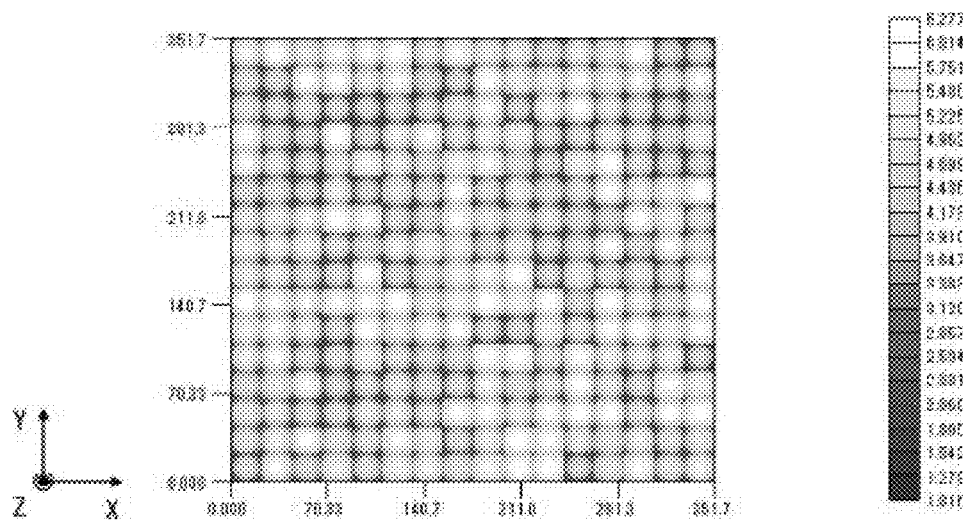
FIG. 18 is a view showing the height distribution of a microlens array according to an example 3.
Figure 19:
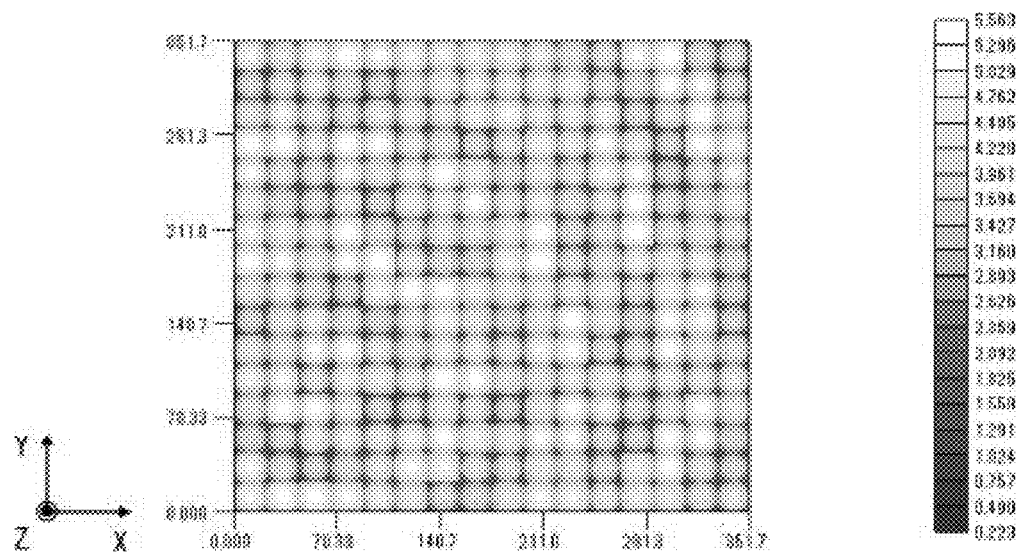
FIG. 19 is a view showing the height distribution of a microlens array according to an example 4.
Figure 20:
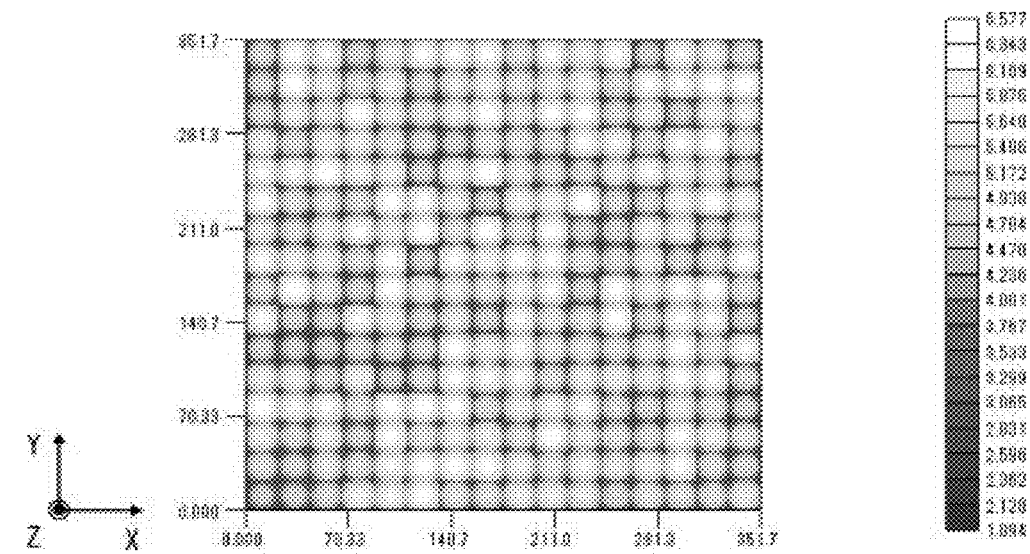
FIG. 20 is a view showing the height distribution of a microlens array according to a comparative example 1.
Figure 21:
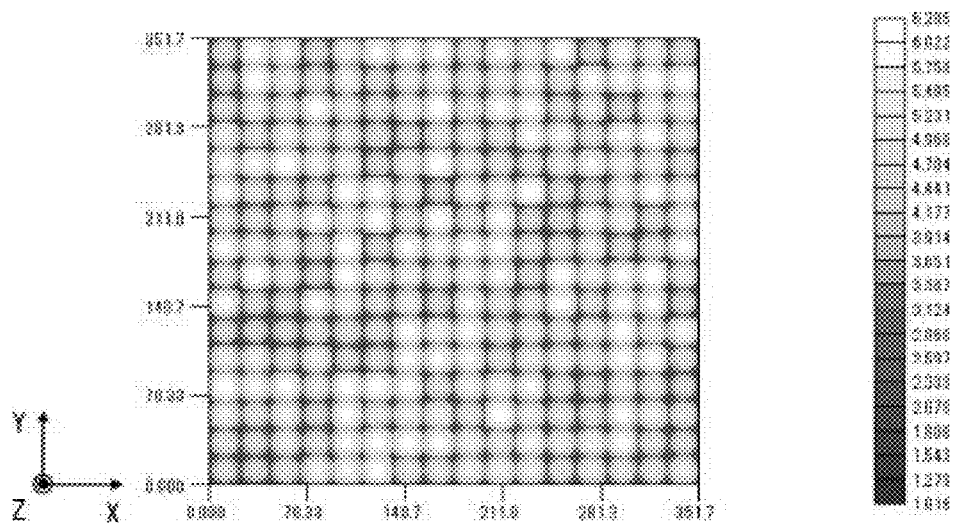
FIG. 21 is a view showing the height distribution of a microlens array according to a comparative example 2.
Figure 22:
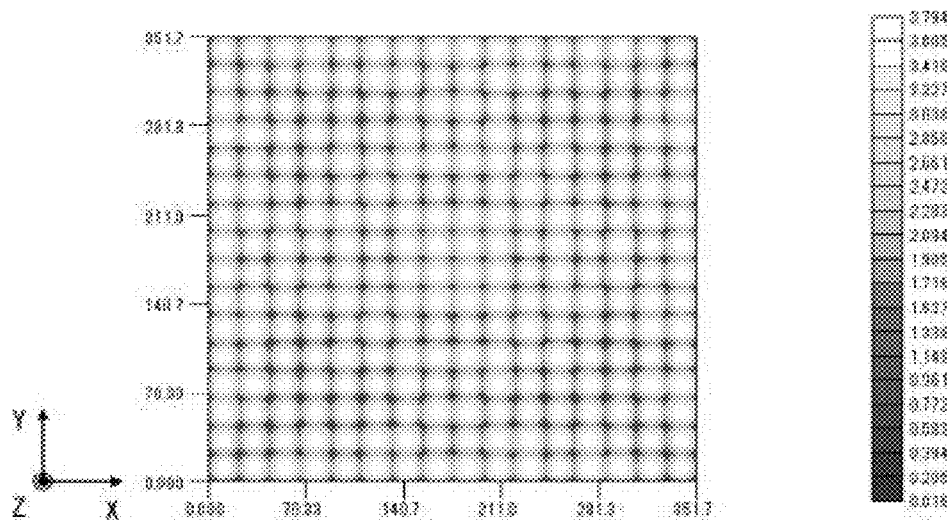
FIG. 22 is a view showing the height distribution of a microlens array according to a comparative example 3.
Figure 23:
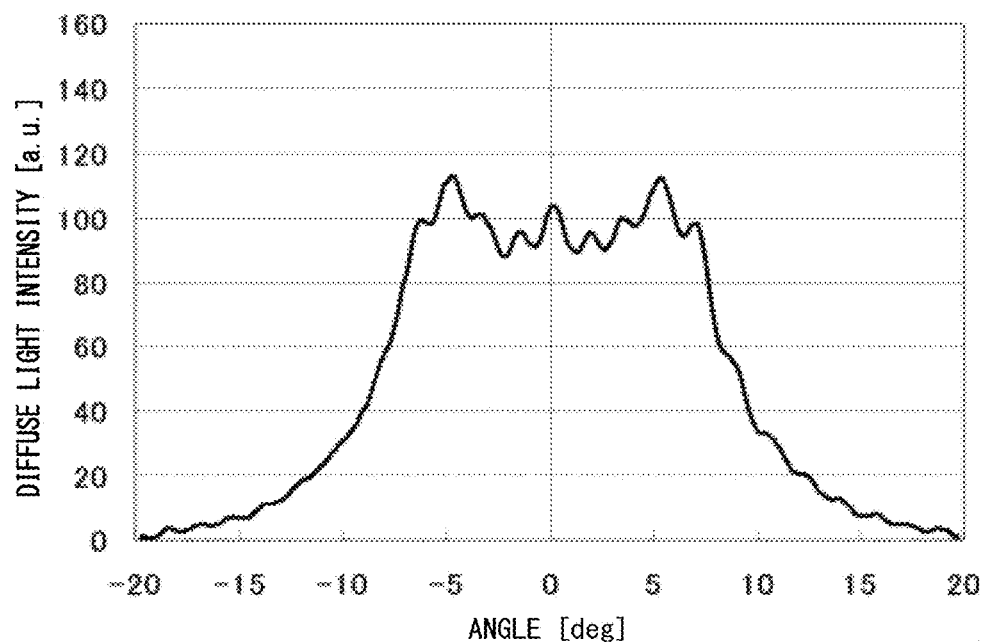
FIG. 23 is a view showing the angle distribution of diffuse light intensity in the x-axis direction of a diffuser plate according to the example 1.
Figure 24:
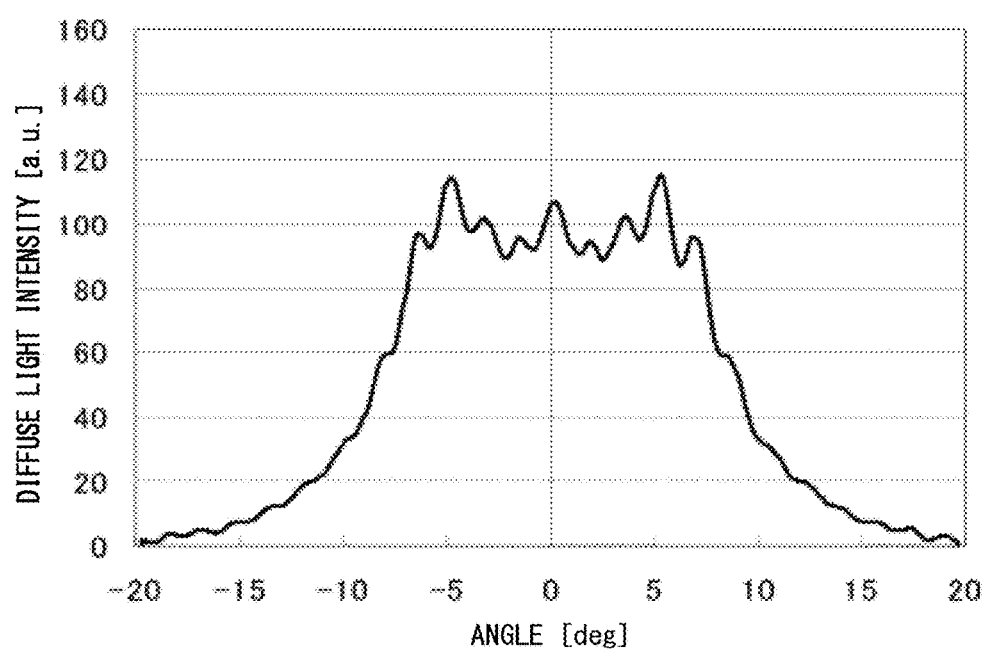
FIG. 24 is a view showing the angle distribution of diffuse light intensity in the x-axis direction of a diffuser plate according to the example 2.
Figure 25:
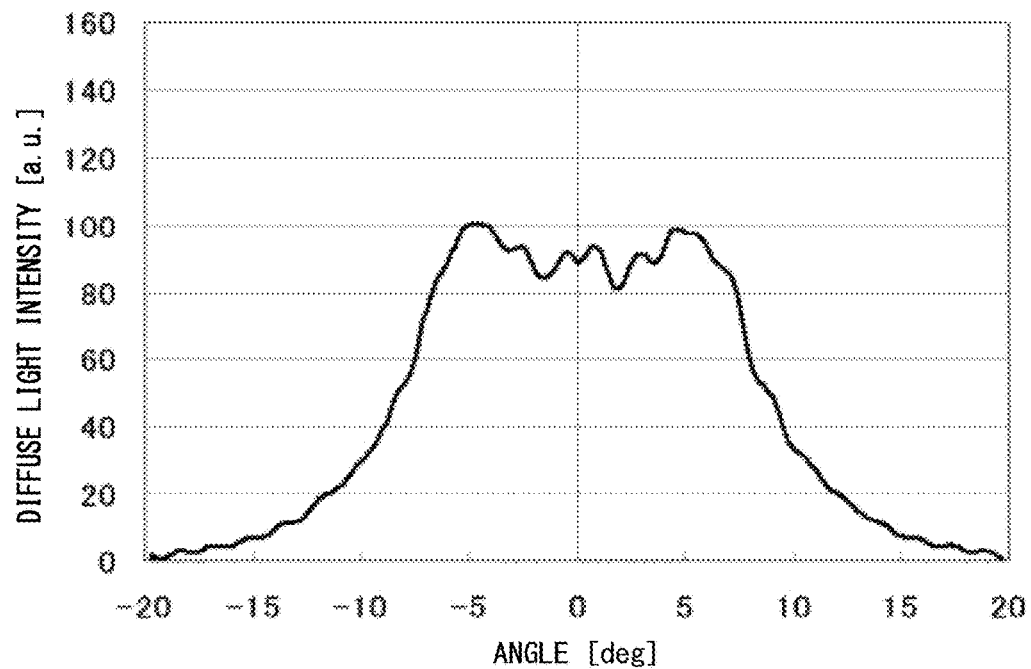
FIG. 25 is a view showing the angle distribution of diffuse light intensity in the x-axis direction of a diffuser plate according to the example 3.
Figure 26:
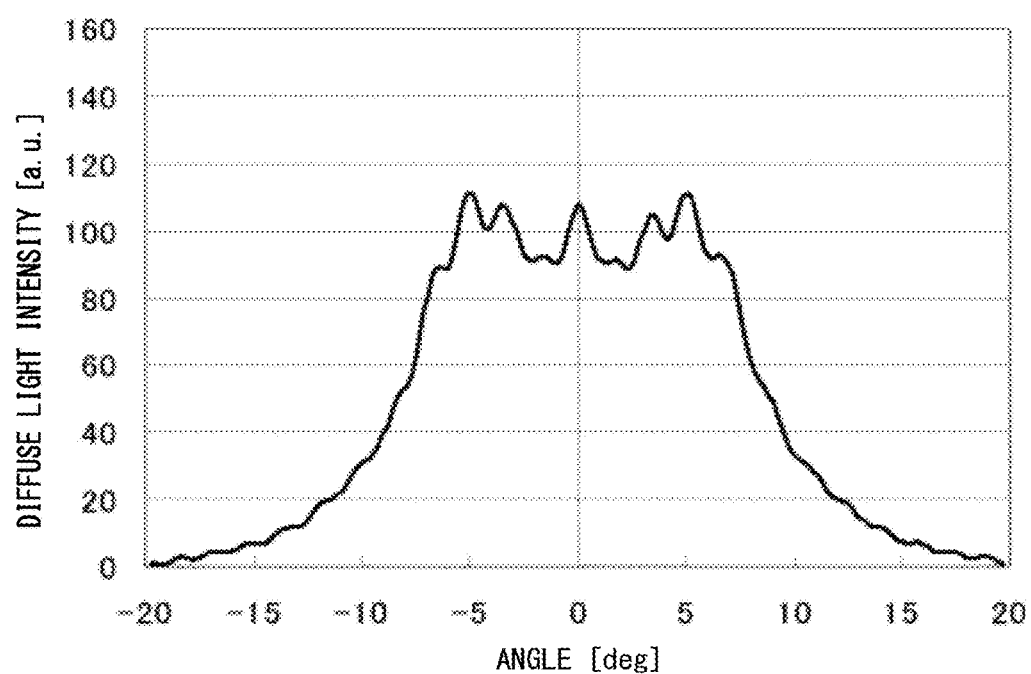
FIG. 26 is a view showing the angle distribution of diffuse light intensity in the x-axis direction of a diffuser plate according to the example 4.
Figure 27:
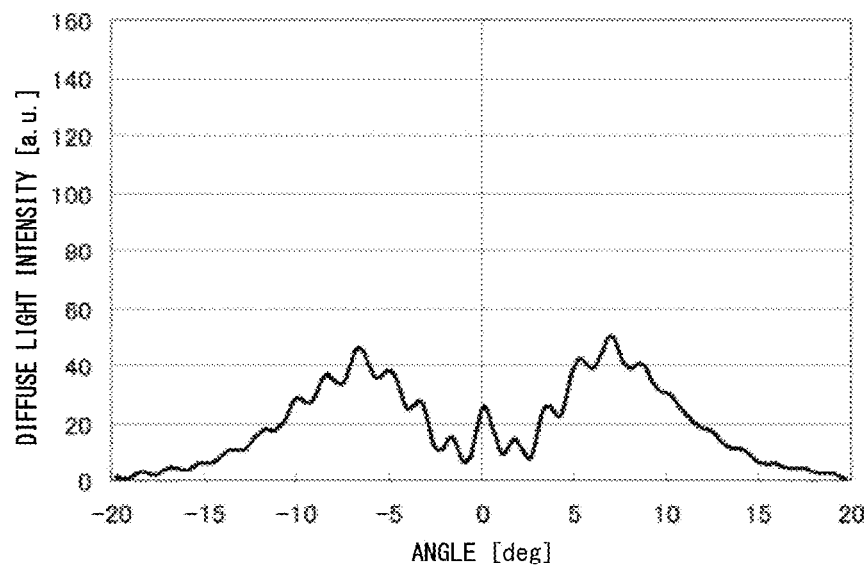
FIG. 27 is a view showing the angle distribution of diffuse light intensity in the x-axis direction of a diffuser plate according to the comparative example 3.
Figure 28:
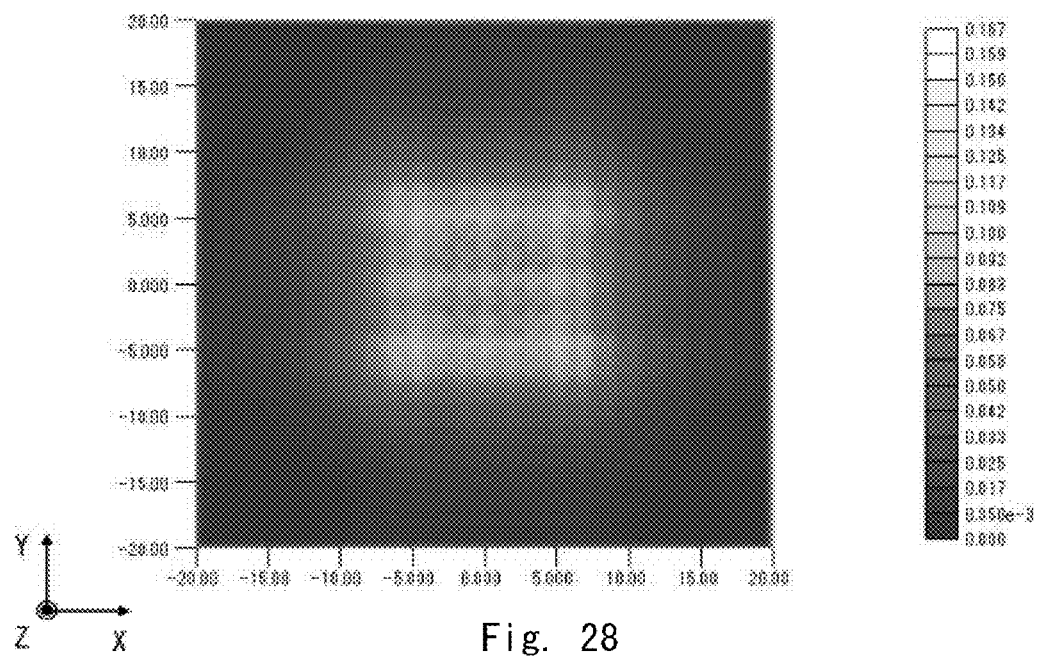
FIG. 28 is a view showing a He—Ne laser diffuse image of the diffuser plate according to the example 1.
Figure 29:
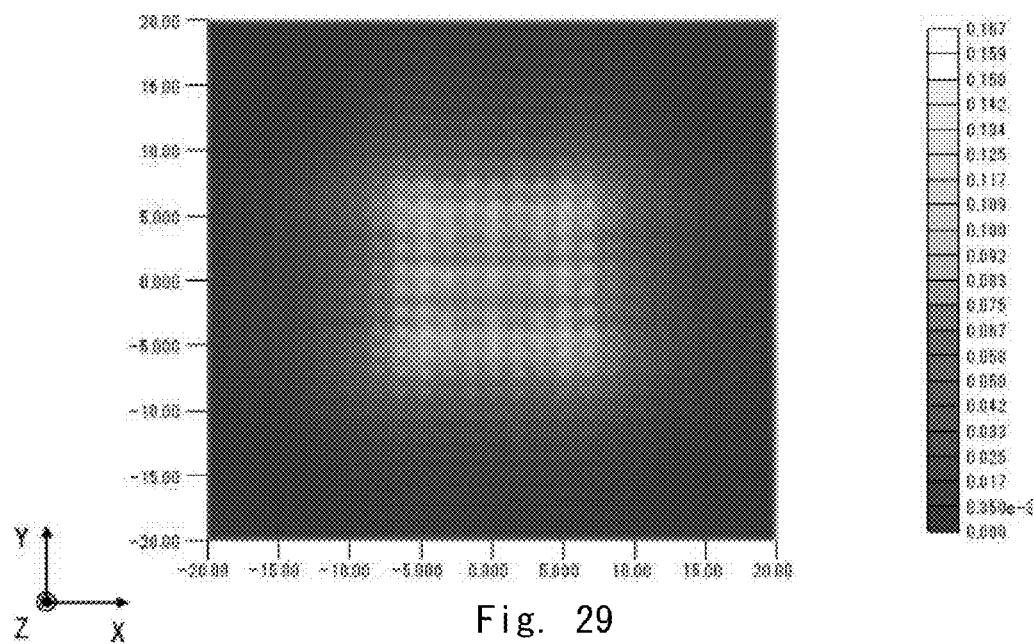
FIG. 29 is a view showing a He—Ne laser diffuse image of the diffuser plate according to the example 2.
Figure 30:
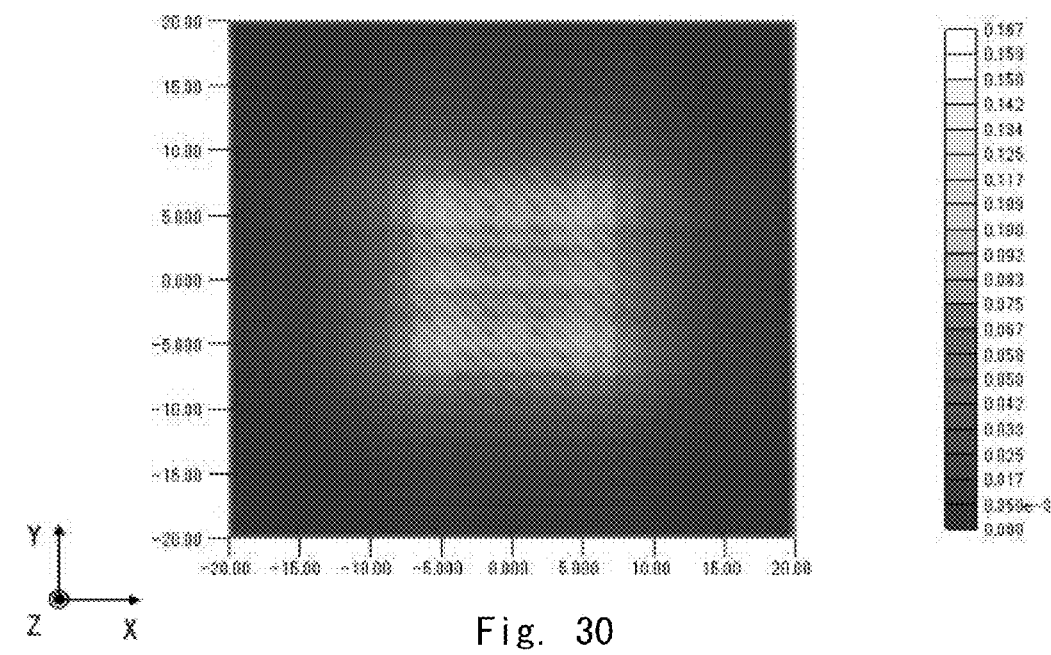
FIG. 30 is a view showing a He—Ne laser diffuse image of the diffuser plate according to the example 3.
Figure 31:
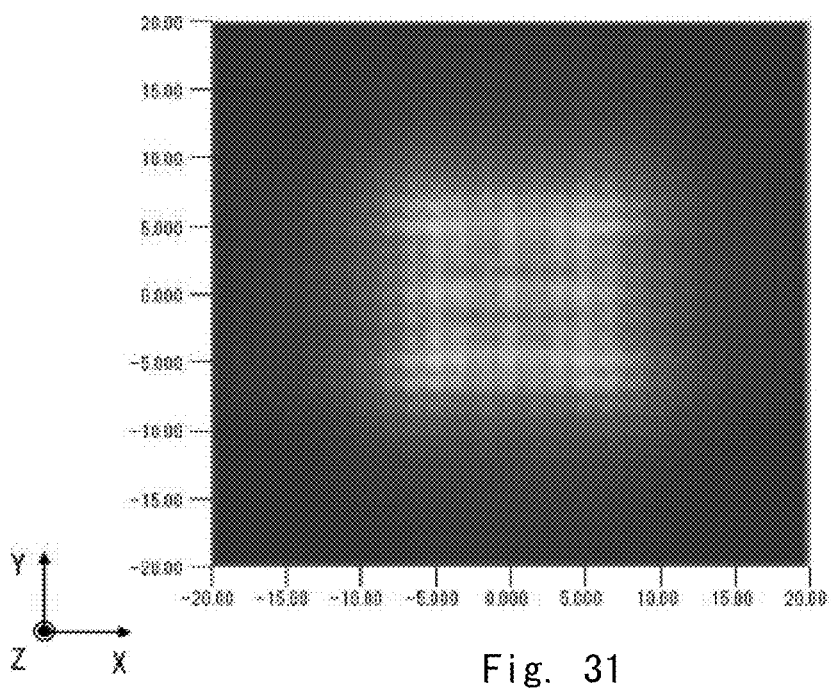
FIG. 31 is a view showing a He—Ne laser diffuse image of the diffuser plate according to the example 4.
Figure 32:
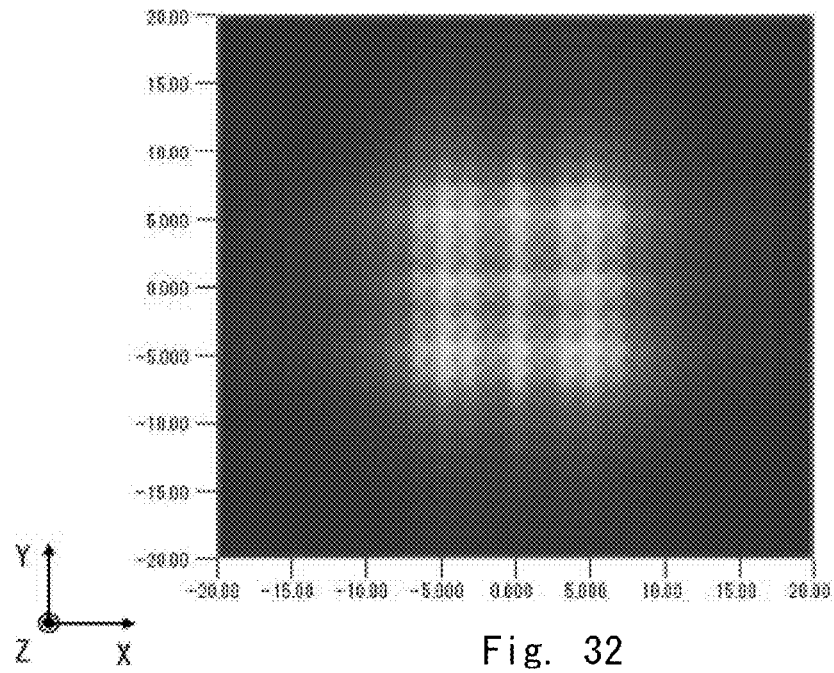
FIG. 32 is a view showing a He—Ne laser diffuse image of the diffuser plate according to the comparative example 1.
Figure 33:
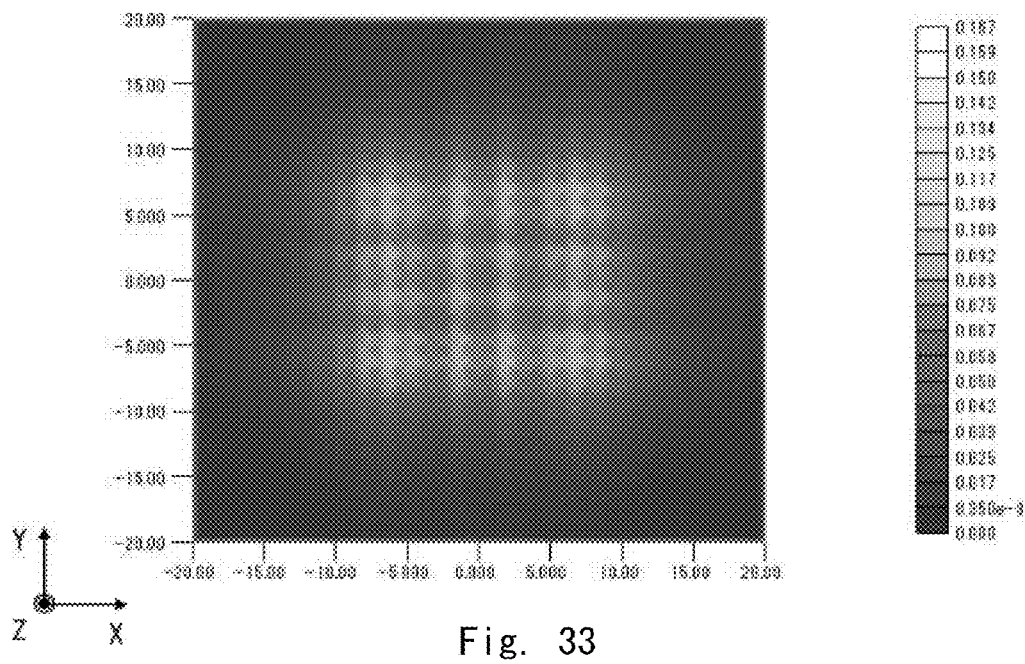
FIG. 33 is a view showing a He—Ne laser diffuse image of the diffuser plate according to the comparative example 2.

| Microlenses used A:B:C:D | Variations in luminance ($L_{STD}$) [a, u] | Angle range where diffuse light intensity is substantially uniform (AngB) [deg] | Corresponding diagram |
|---|---|---|---|
| 1:0:0:0 | $13.3 \times 10^{-2}$ | 13.7 | FIG. 7 |
| 0:1:0:0 | $14.6 \times 10^{-2}$ | 11.7 | FIG. 8 |
| 0:0:1:0 | $14.8 \times 10^{-2}$ | 14.8 | FIG. 9 |
| 0:0:0:1 | $19.7 \times 10^{-2}$ | 17.7 | FIG. 10 |
| 0:1:1:0 | $8.17 \times 10^{-2}$ | 14.1 | FIG. 11 |
| 0:1:1:1 | $6.81 \times 10^{-2}$ | 14.3 | FIG. 12 |
| 0:1:3:2 | $10.3 \times 10^{-2}$ | 14.7 | FIG. 13 |
| 1:0:1:1 | $8.97 \times 10^{-2}$ | 14.5 | FIG. 14 |
| 1:1:1:1 | $7.12 \times 10^{-2}$ | 14.3 | FIG. 15 |

It is shown that variations in intensity (variations in luminance) due to diffraction and interference (see $L_{STD}$ in Table 1) are smaller in the angle distribution of diffuse light intensity obtained by selecting and averaging two or more types of microlenses at a specific quantity ratio (FIGS. 11 to 15) in comparison with the angle distribution of diffuse light intensity of each sample diffuser plate composed of only one shape type of microlenses out of the microlenses A, B, C and D (FIGS. 7 to 10).

Further, as shown in Table 1, the angle range (AngB) where the diffuse light intensity of the diffuser plates corresponding to FIGS. 11 to 15 is substantially uniform satisfies the range of 12.6°≤AngB≤15.4°. When the desired angle range (AngA) is 14°, an angle which is +10% of AngA is 15.4°, and an angle which is −10% of AngA is 12.6°. Thus, it is within ±10% of the desired angle range (AngA) compared with the angle range (AngB) where the diffuse light intensity of the sample diffuser plate composed only of one shape type of microlenses. Note that, although not described in detail, the angle range (AngB) where the diffuse light intensity of the diffuser plate is substantially uniform can be closer to the desired angle range (AngA) if the quantity ratio of the microlenses A to D is adjusted to a more appropriate value.

Examples 1 to 4

Based on the results of the preliminary experiment described above, the microlenses A, B, C and D were selected at a quantity ratio of A:B:C:D=0:1:1:1 in which variations in luminance ($L_{STD}$ in Table 1) were the smallest in the examples 1 to 4 according to the present invention. Selection and placement $U_{x,y}$ of microlenses in a microlens array were determined randomly or according to the function represented by the expression (8) as described above. The height $H_{x,y}$ of the raised part 41 of each microlens was determined randomly or according to the function represented by the expression (10) as described above.

Table 2 shows the designs conditions of the microlens array, and the measured values of variations in luminance ($L_{STD}$), and the angle range (AngB) where the diffuse light intensity is substantially uniform in the examples 1 to 4 and the comparative examples 1 to 3.

Note that, although not described in detail, variations in luminance ($L_{STD}$) of the microlens array obtained by selecting and averaging two or more shape types of microlenses at a specific quantity ratio can be smaller than those shown in the examples 1 to 4 if the quantity ratio of the microlenses A to D is adjusted to a more appropriate value.

FIGS. 16 to 22 show design results of the microlens array in a unit area of about 350 μm×350 μm in the examples 1 to 4 and the comparative examples 1 to 3. In FIGS. 16 to 22, the height from the undersurface is shown by a gray scale, and the color becomes lighter as the height from the undersurface is larger. A plurality of such unit areas are placed to thereby design a microlens array area of about 30 mm×30 mm.

Using the design data of the microlens array area described above, a stamper in which a microlens array with convex lenses is formed was obtained by the maskless lithography process and the electroforming process described above. Using this stamper, the concave-convex pattern of the microlens array was transferred to an acrylic sheet with a thickness of 1 mm by thermal pressing (heating

TABLE 2

| | Microlenses used A:B:C:D | Lens selection/ placement $U_{x,y}$ | Height of raised part $H_{x,y}$ | Variations in luminance ($L_{STD}$) [a, u] | Angle range where diffuse light intensity is substantially uniform (AngB) [deg] |
|---|---|---|---|---|---|
| Example 1 | 0:1:1:1 | Random | Random | $6.75 \times 10^{-2}$ | 14.3 |
| Example 2 | 0:1:1:1 | Random | Equation (10) | $7.36 \times 10^{-2}$ | 14.2 |
| Example 3 | 0:1:1:1 | Equation (8) | Random | $6.09 \times 10^{-2}$ | 14.2 |
| Example 4 | 0:1:1:1 | Equation (8) | Equation (10) | $7.38 \times 10^{-2}$ | 13.9 |
| Comparative example 1 | 1:0:0:0 | — | Random | $13.3 \times 10^{-2}$ | 13.7 |
| Comparative example 2 | 0:0:0:1 | — | Random | $19.7 \times 10^{-2}$ | 17.7 |
| Comparative example 3 | 0:1:1:1 | Equation (8) | Fixed | $49.4 \times 10^{-2}$ | 21.5 |

In the microlens array in the comparative example 1, only the microlens A was used, and the height $H_{x,y}$ of the raised part 41 was determined randomly. In the microlens array in the comparative example 2, only the microlens D was used, and the height $H_{x,y}$ of the raised part 41 was determined randomly. In the microlens array in the comparative example 3, the quantity ratio of the microlenses was set to A:B:C:D=0:1:1:1, just like in the examples 1 to 4. However, in the microlens array in the comparative example 3, the height $H_{x,y}$ of the raised part 41 was a fixed value for all microlenses, and the selection and placement $U_{x,y}$ of the lens shape of each microlens was determined according to the function represented by the expression (8). Note that, for the height of the raised part 41, the maximum difference in height was ΔH=1.5 μm, just like in the preliminary experiment.

As shown in Table 2, the diffuser plates 10 in the examples 1 to 4 satisfied all of the conditions (a) to (c).
(a) Variations in luminance ($L_{STD}$) of the microlens arrays in the examples 1 to 4 are smaller than variations in luminance ($L_{STD}$) of the microlens arrays in the comparative examples 1 to 3.
(b) Variations in luminance ($L_{STD}$) of the microlens arrays in the examples 1 to 4 are equal to or less than $9.00 \times 10^{-2}$.
(c) The angle range (AngB) where the diffuse light intensity is substantially uniform in the microlens arrays in the examples 1 to 4 is within ±10% of the desired angle range (AngA). Specifically, it satisfies the range of 12.6°≤AngB≤15.4°.

at 150° C., pressure at 0.9 MPa, pressure time for 300 seconds). The molding was done without a problem like sticking of parts in the mold, and the diffuser plate in which the microlens array was formed on one surface was obtained.

FIGS. 23 to 26, 7, 10 and 27 show the angle distribution of diffuse light intensity in the x-axis direction obtained from the He—Ne laser diffuse image for each of the diffuser plates in the examples 1 to 4 and the comparative examples 1 to 3, respectively. As for the angle distribution of diffuse light intensity in the x-axis direction shown in FIGS. 23 to 26, 7, 10 and 27, a He—Ne laser diffuse image photograph was taken for each diffuser plate, the diffuse light intensity at each diffusion angle) x (°) corresponding to y=0±0.5° on each photograph was extracted each at x=0.1°, and the arithmetic average of the diffuse light intensity at 11 points where x=0.1×n'° (n': given integer) and y=−0.5°, −0.4°, −0.3°, −0.2°, −0.1°, 0°, 0.1°, 0.2°, 0.3°, 0.4° and 0.5° was the diffuse light intensity at x=0.1×'°. The distribution of diffuse light intensity in the range of x=−20° to 20° was the angle distribution of diffuse light intensity in the x-axis direction.

In the angle distribution of diffuse light intensity in the x-axis direction in the comparative examples 1 and 2 (FIGS. 7 and 10), which are related art, large variations in luminance due to diffraction spots were observed near −5° to +5°. Further, in the angle distribution of diffuse light intensity in the x-axis direction in the comparative example 3 (FIG. 27), periodic variations in luminance were observed. On the other hand, in the diffuser plates in the examples 1 to 4 (FIGS. 23 to 26), it was observed that diffraction was reduced, and variations in luminance were improved.

Figure 34:
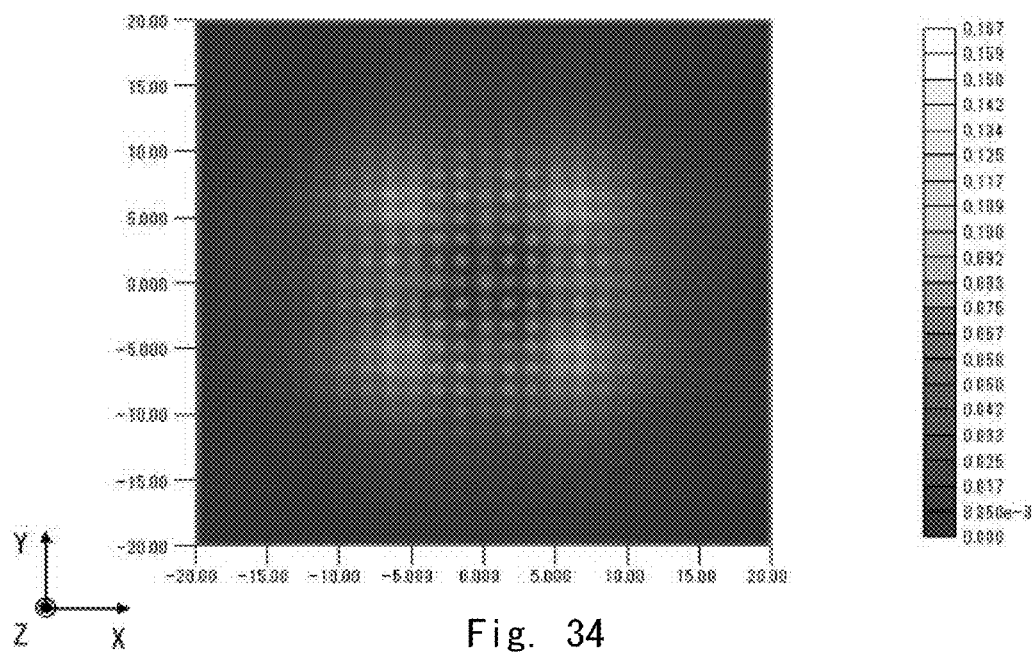
FIG. 34 is a view showing a He—Ne laser diffuse image of the diffuser plate according to the comparative example 3.

FIGS. 28 to 34 show He—Ne laser diffuse images of the diffuser plates in the examples 1 to 4 and the comparative examples 1 to 3. In the diffuser plates according to related art (FIGS. 32 and 33), two heavy dark lines each in the x and y directions were observed, and variations in luminance due to diffraction occurred. Further, variations in color were also observed from diffuse images when white LED light was incident to the surface without the microlens array at a distance of about 4 cm. In addition, in the comparative example 3, significant diffraction spots were observed all over the diffuse image (FIG. 34). On the other hand, in the He—Ne laser diffuse images of the diffuser plates according to the present invention (FIGS. 28 to 31), variations in luminance due to diffraction were largely improved. Further, variations in color were also reduced in diffuse images from white LED on the diffuser plates according to the present invention.

According to the present invention, by setting the diffuse light intensity to be substantially uniform in a desired angle range, it is possible to provide a diffuser plate where variations in luminance of transmitted light or reflected light in one microlens array are improved.

It should be noted that the present invention is not limited to the above-described exemplary embodiment and may be varied in many ways within the scope of the present invention. For example, although the description is based on the assumption that the microlens is a convex lens in the above embodiment, the microlens with a concave lens functions as the diffuser plate in the same manner. Further, although the description is based on the assumption that the diffuser plate is a transmissive diffuser plate in the above embodiment, the present invention is achieved also with a reflective diffuser plate. The "microlens" in the reflective diffuser plate is the one where a reflective coating is formed on the surface in the concave-convex shape.

This application is based upon and claims the benefit of priority from Japanese patent application No. 2014-201607, filed on Sep. 30, 2014, the disclosure of which is incorporated herein in its entirety by reference.

REFERENCE SIGNS LIST

10 DIFFUSER PLATE
31 MICROLENS
41 RAISED PART
S1 REFERENCE SURFACE
ΔH MAXIMUM DIFFERENCE IN HEIGHT OF APEX OF A PLURALITY OF CONVEX MICROLENSES
ΔD MAXIMUM DIFFERENCE IN HEIGHT OF APEX OF A PLURALITY OF CONCAVE MICROLENSES
AngA DESIRED ANGLE RANGE
AngB ANGLE RANGE WHERE DIFFUSE LIGHT INTENSITY IS SUBSTANTIALLY UNIFORM
$L_{AVE}$ ARITHMETIC AVERAGE OF LIGHT INTENSITY IN DESIRED ANGLE RANGE
$L_{ave}'$ RELATIVE INTENSITY OF 90% WITH RESPECT TO ARITHMETIC AVERAGE OF LIGHT INTENSITY IN DESIRED ANGLE RANGE

The invention claimed is:

1. A diffuser plate, comprising:
a plurality of microlenses; and
a phase difference generation part provided between the plurality of microlenses and a principal surface, when provided on the principal surface;
wherein:
the plurality of microlenses comprises at least two different types of lens shapes, and numbers of microlenses having each of the respective different types of lens shapes satisfy a predetermined quantity ratio;
when coordinates are assigned to locations on the principal surface, the lens shape type of each microlens is selected in relation to coordinates of a location on the principal surface beneath a center of the respective microlens when provided on the principal surface;
when an arithmetic average of diffuse light intensity in a desired angle range in the diffuser plate is 1, a standard deviation of relative intensity of diffuse light intensity in the desired angle range is equal to or less than $9.00 \times 10^{-2}$; and
an angle range in which the diffuse light intensity is substantially uniform is in a range of +10% to −10% of the desired angle range, where the angle range in which the diffuse light intensity is substantially uniform is a difference between a diffusion angle at which an absolute value reaches its maximum on a positive side and a diffusion angle at which an absolute value reaches its maximum on a negative side, out of diffusion angles with a relative intensity of 90% with respect to an arithmetic average of diffuse light intensity in the desired angle range, when a direction along a light incidence direction is at a diffusion angle of 0°, one direction in an angle distribution measurement direction is positive, and an opposite direction is negative in an angle distribution of diffuse light intensity in one direction of the diffuser plate.

2. The diffuser plate according to claim 1, wherein a maximum value of a phase difference caused by the phase difference generation part is larger than 0.2 times a wavelength of light to be used.

3. The diffuser plate according to claim 1, wherein the desired angle range AngA is 0°≤AngA≤40°.

4. The diffuser plate according to claim 1, wherein:
when coordinates are assigned to locations on the principal surface, a height of the phase difference generation part above a location on the principal surface beneath a center of a respective microlens varies in accordance with an algebraic function, an elementary function, or a composite function of coordinates of a location on the principal surface beneath a center of the respective microlens when provided on the principal surface; and
the coordinates are independent variables.

5. The diffuser plate according to claim 1, wherein when coordinates are assigned to locations on the principal surface, a height of the phase difference generation part above a location on the principal surface is selected randomly in relation to coordinates of the location on the principal surface when provided on the principal surface.

6. The diffuser plate according to claim 1, wherein:
when coordinates are assigned to locations on the principal surface, the lens shape type of each microlens is selected in accordance with an algebraic function, an elementary function, or a composite function of coordinates of a location on the principal surface beneath a center of the respective microlens when provided on the principal surface; and the coordinates are independent variables.

7. The diffuser plate according to claim 1, wherein when coordinates are assigned to locations on the principal surface, the lens shape type of each microlens is selected randomly in relation to coordinates of a location on the principal surface beneath a center of the respective microlens when provided on the principal surface.

8. A method for producing a diffuser plate according to claim 1, the method comprising:

designing a plurality of types of microlens sets, each of the plurality of microlens sets comprising a plurality of microlenses and a phase difference generation part provided between the plurality of microlenses and a principal surface when provided on the principal surface, and each type of microlens set having a different type of lens shape providing an angle distribution of diffuse light intensity close to a desired angle range;

producing a plurality of types of sample molds having shapes respectively corresponding to the plurality of types of microlens sets;

transferring a shape of each type of microlens set to a resin with a sample mold, and thereby producing a plurality of types of sample diffuser plates each having a diffusion pattern corresponding to a respective type of microlens set;

evaluating optical properties of each of the plurality of types of sample diffuser plates;

designing a microlens array combining types of microlens sets based on evaluation results of the sample diffuser plates;

producing a diffusion pattern mold having a shape corresponding to the microlens array; and transferring the diffusion pattern to the resin with the diffusion pattern mold.

* * * * *